United States Patent
Suzuki et al.

(10) Patent No.: US 12,043,339 B2
(45) Date of Patent: Jul. 23, 2024

(54) WIRELESS COMMUNICATION DEVICE AND OPERATING SYSTEM FOR HUMAN-POWERED VEHICLE

(71) Applicant: SHIMANO INC., Sakai (JP)

(72) Inventors: Takafumi Suzuki, Sakai (JP); Takaya Masuda, Sakai (JP); Akihiko Syouge, Sakai (JP)

(73) Assignee: SHIMANO INC., Sakai (JP)

( * ) Notice: Subject to any disclaimer, the term of this patent is extended or adjusted under 35 U.S.C. 154(b) by 960 days.

(21) Appl. No.: 16/212,688

(22) Filed: Dec. 7, 2018

(65) Prior Publication Data
US 2020/0180725 A1 Jun. 11, 2020

(51) Int. Cl.
| | |
|---|---|
| *B62K 23/02* | (2006.01) |
| *B62J 1/08* | (2006.01) |
| *B62J 99/00* | (2020.01) |
| *B62L 1/00* | (2006.01) |
| *B62L 3/00* | (2006.01) |
| *B62M 25/08* | (2006.01) |
| *B62J 6/165* | (2020.01) |
| *B62J 45/00* | (2020.01) |

(Continued)

(52) U.S. Cl.
CPC .............. *B62K 23/02* (2013.01); *B62J 1/08* (2013.01); *B62J 99/00* (2013.01); *B62L 1/00* (2013.01); *B62L 3/00* (2013.01); *B62M 25/08* (2013.01); *B62J 2001/085* (2013.01); *B62J 6/165* (2020.02); *B62J 45/00* (2020.02); *B62J 45/20* (2020.02); *B62J 45/40* (2020.02); *H04W 4/40* (2018.02)

(58) Field of Classification Search
CPC ....................................................... B62M 25/08
See application file for complete search history.

(56) References Cited

U.S. PATENT DOCUMENTS 6,196,707 B1 * 3/2001 Deckard ................... B62J 6/16
362/473
8,721,495 B2 5/2014 Kitamura et al.
(Continued)

FOREIGN PATENT DOCUMENTS

| | | | |
|---|---|---|---|
| CN | 105383632 | 3/2016 | |
| EP | 3343235 A1 * | 7/2018 | ............ B62M 9/132 |
| JP | S6045945 U * | 4/1985 | |

OTHER PUBLICATIONS

USPTO Machine Translation (retrieved from FIT database) of the Description of JP S6045945 U, Apr. 1, 1985. (Year: 2023).*

*Primary Examiner* — Daniel D Yabut
(74) *Attorney, Agent, or Firm* — MORI & WARD, LLP

(57) ABSTRACT

A wireless communication device for a human-powered vehicle comprises a wireless communicator and a controller. The wireless communicator is configured to wirelessly communicate with an additional wireless communicator. The wireless communicator has a first mode in which the wireless communicator operates under a first power consumption and a second mode in which the wireless communicator operates under a second power consumption which is lower than the first power consumption. The controller is configured to detect a change in a state of at least one switch. The controller is configured to set the wireless communicator with the first mode if the controller detects the change in the state of the at least one switch as the wireless communicator is in the second mode.

21 Claims, 19 Drawing Sheets

(51) Int. Cl.
*B62J 45/20* (2020.01)
*B62J 45/40* (2020.01)
*H04W 4/40* (2018.01)

(56) References Cited

U.S. PATENT DOCUMENTS

| | | |
|---|---|---|
| 8,909,424 B2 | 12/2014 | Jordan et al. |
| 9,840,294 B2 | 12/2017 | Hara |
| 2009/0240858 A1* | 9/2009 | Takebayashi ......... H04L 12/403 |
| | | 710/110 |
| 2012/0253600 A1* | 10/2012 | Ichida .................... B62K 19/36 |
| | | 701/1 |
| 2013/0334874 A1* | 12/2013 | Shirai .................... B62M 25/08 |
| | | 307/9.1 |
| 2014/0102237 A1* | 4/2014 | Jordan .................. B62K 23/02 |
| | | 74/473.12 |
| 2015/0355042 A1* | 12/2015 | Kodama ............... G01L 5/1627 |
| | | 73/862.045 |
| 2016/0257370 A1* | 9/2016 | Hashimoto ............ B62K 19/36 |
| 2016/0311491 A1* | 10/2016 | Watarai .................. B62M 25/08 |
| 2016/0339986 A1* | 11/2016 | Jordan ................... B62M 25/08 |
| 2017/0096185 A1* | 4/2017 | Hara ......................... B62J 1/08 |
| 2018/0057105 A1* | 3/2018 | Komatsu ................ B62M 25/08 |
| 2018/0154980 A1* | 6/2018 | Lee ........................ B60L 50/20 |
| 2018/0178870 A1* | 6/2018 | Takeshita ................ B62J 50/22 |
| 2018/0222548 A1* | 8/2018 | Lee ........................ B62J 45/20 |
| 2018/0238354 A1* | 8/2018 | Komada ............... B62M 25/08 |
| 2018/0326868 A1* | 11/2018 | Lee ........................ B60L 15/20 |
| 2019/0348239 A1* | 11/2019 | Chu ........................ F16D 55/22 |

\* cited by examiner

WIRELESS COMMUNICATION DEVICE AND OPERATING SYSTEM FOR HUMAN-POWERED VEHICLE

BACKGROUND OF THE INVENTION

Field of the Invention

The present invention relates to a wireless communication device and an operating system for a human-powered vehicle.

Discussion of the Background

A human-powered vehicle includes a wireless communication system configured to operate a wireless component.

SUMMARY OF THE INVENTION

In accordance with a first aspect of the present invention, a wireless communication device for a human-powered vehicle comprises a wireless communicator and a controller. The wireless communicator is configured to wirelessly communicate with an additional wireless communicator. The first wireless communicator has a first mode in which the wireless communicator operates under a first power consumption and a second mode in which the wireless communicator operates under a second power consumption which is lower than the first power consumption. The controller is configured to detect a change in a state of at least one switch. The controller is configured to set the wireless communicator with the first mode if the controller detects the change in the state of the at least one switch as the wireless communicator is in the second mode.

With the wireless communication device according to the first aspect, it is possible to change the mode of the wireless communicator from the second mode to the first mode using a simple structure such as the at least one switch. This can reduce power consumption of the wireless communication device with the simple structure.

In accordance with a second aspect of the present invention, the wireless communication device according to the first aspect is configured so that the controller is configured to detect an activation of the at least one switch in response to the change in the state of the at least one switch. The controller is configured to set the wireless communicator with the first mode if the controller detects the activation of the at least one switch.

With the wireless communication device according to the second aspect, it is possible to change the mode of the wireless communicator from the second mode to the first mode using a simple structure such as the at least one switch. This can reduce power consumption of the wireless communication device with the simple structure.

In accordance with a third aspect of the present invention, the wireless communication device according to the first or second aspect is configured so that the controller is configured to set the wireless communicator with the second mode if the wireless communicator does not receive a communication signal in the first mode.

With the wireless communication device according to the third aspect, it is possible to change the mode of the wireless communicator from the first mode to the second mode automatically in a nonuse state. This can effectively reduce power consumption of the wireless communication device with the simple structure.

In accordance with a fourth aspect of the present invention, the wireless communication device according to any one of the first to third aspects is configured so that the controller is configured to set the wireless communicator with the second mode if the wireless communicator does not receive a communication signal in the first mode during a determination time.

With the wireless communication device according to the fourth aspect, it is possible to quickly change the mode of the wireless communicator from the first mode to the second mode automatically in a nonuse state. This can effectively reduce power consumption of the wireless communication device with the simple structure.

In accordance with a fifth aspect of the present invention, the wireless communication device according to any one of the first to fourth aspects is configured so that the wireless communicator is configured to wirelessly receive a shift control signal to change a shift position of a shift changing device from the additional wireless communicator of an operating device.

With the wireless communication device according to the fifth aspect, it is possible to utilize the wireless communicator for the shift changing device.

In accordance with a sixth aspect of the present invention, the wireless communication device according to the first aspect further comprises the at least one switch configured to change the state of the at least one switch in response to a user input.

With the wireless communication device according to the sixth aspect, it is possible to change the mode of the wireless communicator from the second mode to the first mode in response to the user input.

In accordance with a seventh aspect of the present invention, an operating system for a human-powered vehicle comprises the wireless communication device according to any one of the first to fifth aspects and the at least one switch attached to a separate component which is provided separately from the wireless communication device.

With the operating system according to the seventh aspect, it is possible to improve flexibility of arrangement of the at least one switch.

In accordance with an eighth aspect of the present invention, the operating system according to the seventh aspect further comprises a brake caliper provided as the separate component. The at least one switch is attached to the brake caliper to change the state of the at least one switch in response to an operating force applied to the brake caliper.

With the operating system according to the eighth aspect, it is possible to change the mode of the wireless communicator from the second mode to the first mode in response to usage of the brake caliper.

In accordance with a ninth aspect of the present invention, the operating system according to the eighth aspect is configured so that the at least one switch is attached to the brake caliper to change the state of the at least one switch in response to a hydraulic pressure applied to the brake caliper as the operating force.

With the operating system according to the ninth aspect, it is possible to change the mode of the wireless communicator from the second mode to the first mode in response to the hydraulic pressure of the brake caliper.

In accordance with a tenth aspect of the present invention, the operating system according to any one of the seventh to ninth aspects further comprises a seatpost provided as the separate component. The at least one switch is attached to the seatpost to change the state of the at least one switch in response to a user's weight applied to the seatpost.

With the operating system according to the tenth aspect, it is possible to change the mode of the wireless communicator from the second mode to the first mode in response to usage of the seatpost.

In accordance with an eleventh aspect of the present invention, the operating system according to any one of the seventh to ninth aspects further comprises the operating device provided as the separate component. The at least one switch is attached to the operating device to change the state of the at least one switch in response to an operating force output from the operating device.

With the operating system according to the eleventh aspect, it is possible to change the mode of the wireless communicator from the second mode to the first mode in response to usage of the operating device.

In accordance with a twelfth aspect of the present invention, the operating system according to the eleventh aspect is configured so that the at least one switch is attached to the operating device to change the state of the at least one switch in response to a hydraulic pressure generated by the operating device as the operating force.

With the operating system according to the twelfth aspect, it is possible to change the mode of the wireless communicator from the second mode to the first mode in response to the hydraulic pressure of the operating device.

In accordance with a thirteenth aspect of the present invention, the operating system according to any one of the seventh to twelfth aspects further comprises a pedal provided as the separate component. The at least one switch is attached to the pedal to change the state of the at least one switch in response to a weight of a user's foot applied to the pedal.

With the operating system according to the thirteenth aspect, it is possible to change the mode of the wireless communicator from the second mode to the first mode in response to usage of the pedal.

In accordance with a fourteenth aspect of the present invention, the operating system according to the thirteenth aspect further comprises a pedaling force sensor configured to sense a pedaling force applied to a crank to which the pedal is attached. The pedaling force sensor is configured to generate an output signal indicating the pedaling force.

With the operating system according to the fourteenth aspect, it is possible to utilize the wireless communicator in a system including the pedaling force sensor.

In accordance with a fifteenth aspect of the present invention, the operating system according to the fourteenth aspect is configured so that the wireless communicator is configured to wirelessly transmit the output signal to the additional wireless communicator of a notification device.

With the operating system according to the fifteenth aspect, it is possible to utilize the wireless communicator for the pedaling force sensor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
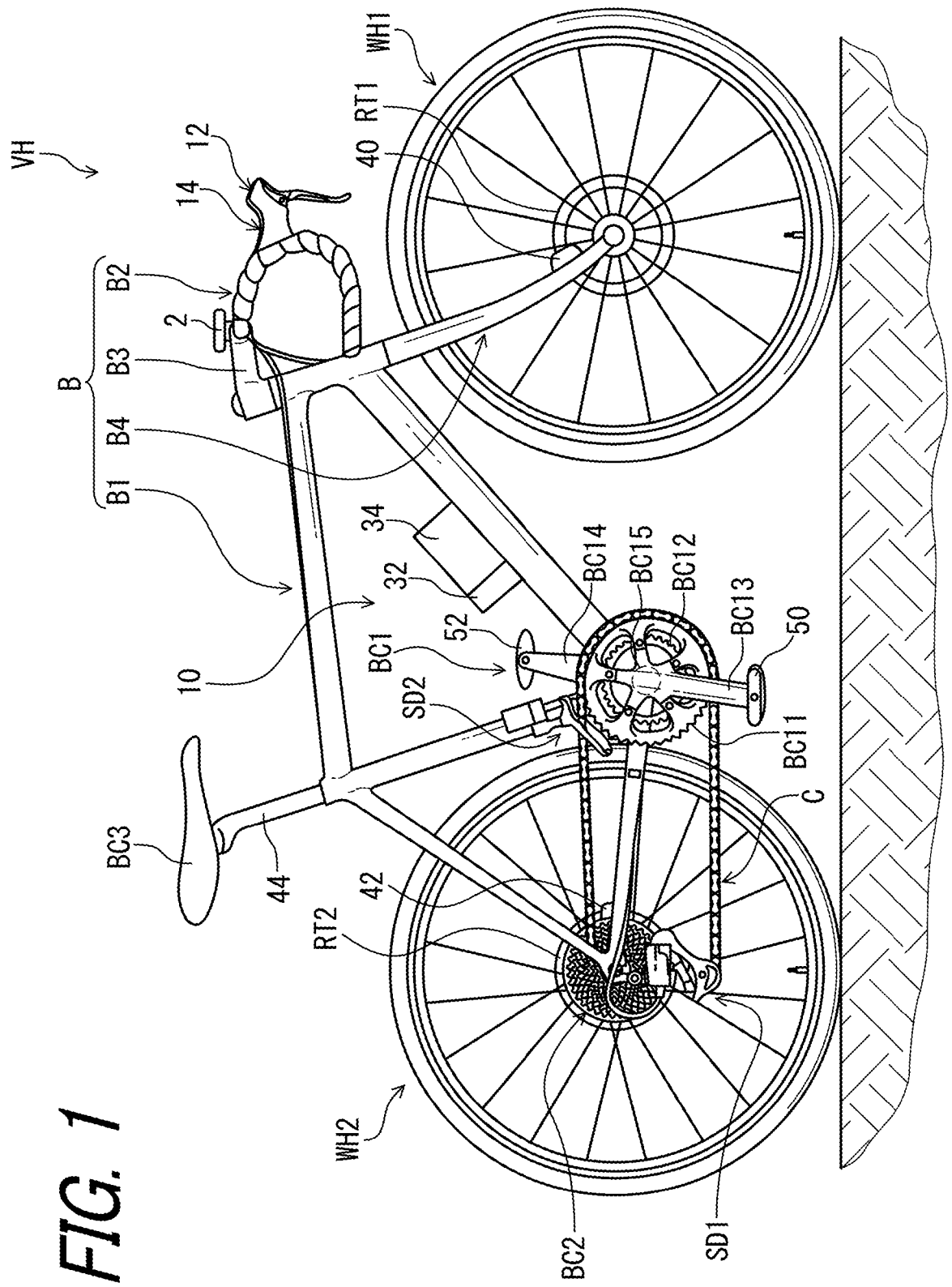
FIG. 1 is a side elevational view of a human-powered vehicle provided with an operating system in accordance with a first embodiment.

The embodiment(s) will now be described with reference to the accompanying drawings, wherein like reference numerals designate corresponding or identical elements throughout the various drawings.

First Embodiment

Referring initially to FIG. 1, a human-powered vehicle VH includes an operating system 10 in accordance with a first embodiment. For example, the human-powered vehicle VH is a vehicle to travel with a motive power including at least a human power of a user who rides the human-powered vehicle VH (i.e., rider). The human-powered vehicle VH has an arbitrary number of wheels. For example, the human-powered vehicle VH has at least one wheel. In this embodiment, the human-powered vehicle VH preferably has a smaller size than that of a four-wheeled automobile. However, the human-powered vehicle VH can have an arbitrary size. For example, the human-powered vehicle VH can have a larger size than that of the four-wheeled automobile. Examples of the human-powered vehicle VH include a bicycle, a tricycle, and a kick scooter. In this embodiment, the human-powered vehicle VH is a bicycle. An electric assisting system including an electric motor can be applied to the human-powered vehicle VH (e.g., the bicycle) to assist muscular motive power of the user. Namely, the human-powered vehicle VH can be an E-bike. While the human-powered vehicle VH is illustrated as a road bike, the operating system 10 can be applied to mountain bikes or any type of human-powered vehicle VH.

As seen in FIG. 1, the human-powered vehicle VH includes a vehicle body B, a crank BC1, a rear sprocket assembly BC2, a saddle BC3, a chain C, and wheels WH1 and WH2. The vehicle body B includes a vehicle frame B1, a handlebar B2, a stem B3, and a front fork B4. The stem B3 couples the handlebar B2 to the front fork B4 with the stem B3. A notification device 2 such as a cycle computer is attached to the stem B3. The crank BC1 includes sprocket wheels BC11 and BC12, crank arms BC13 and BC14, and a crank axle BC15. The crank arms BC13 and BC14 are secured to the crank axle BC15. The sprocket wheels BC11 and BC12 are secured to at least one of the crank atm BC13 and the crank axle BC15. The chain C engages with the rear sprocket assembly BC2 and the sprocket wheels BC11 and BC12 of the crank BC1. In this embodiment, the crank BC1 has two speed stages, and the rear sprocket assembly BC2 has eleven speed stages.

In this embodiment, the human-powered vehicle VH includes shift changing devices SD1 and SD2 configured to change speed stages. More specifically, the shift changing device SD1 includes a rear derailleur configured to shift the chain C between sprockets of the rear sprocket assembly BC2. The shift changing device SD2 includes a front derailleur configured to shift the chain C between the sprocket wheels BC11 and BC12 of the crank BC1.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on the saddle BC3 of the human-powered vehicle VH with facing the handlebar B2. Accordingly, these terms, as utilized to describe the operating system 10 or other components, should be interpreted relative to the human-powered vehicle VH equipped with the operating system 10 as used in an upright riding position on a horizontal surface.

Figure 2:
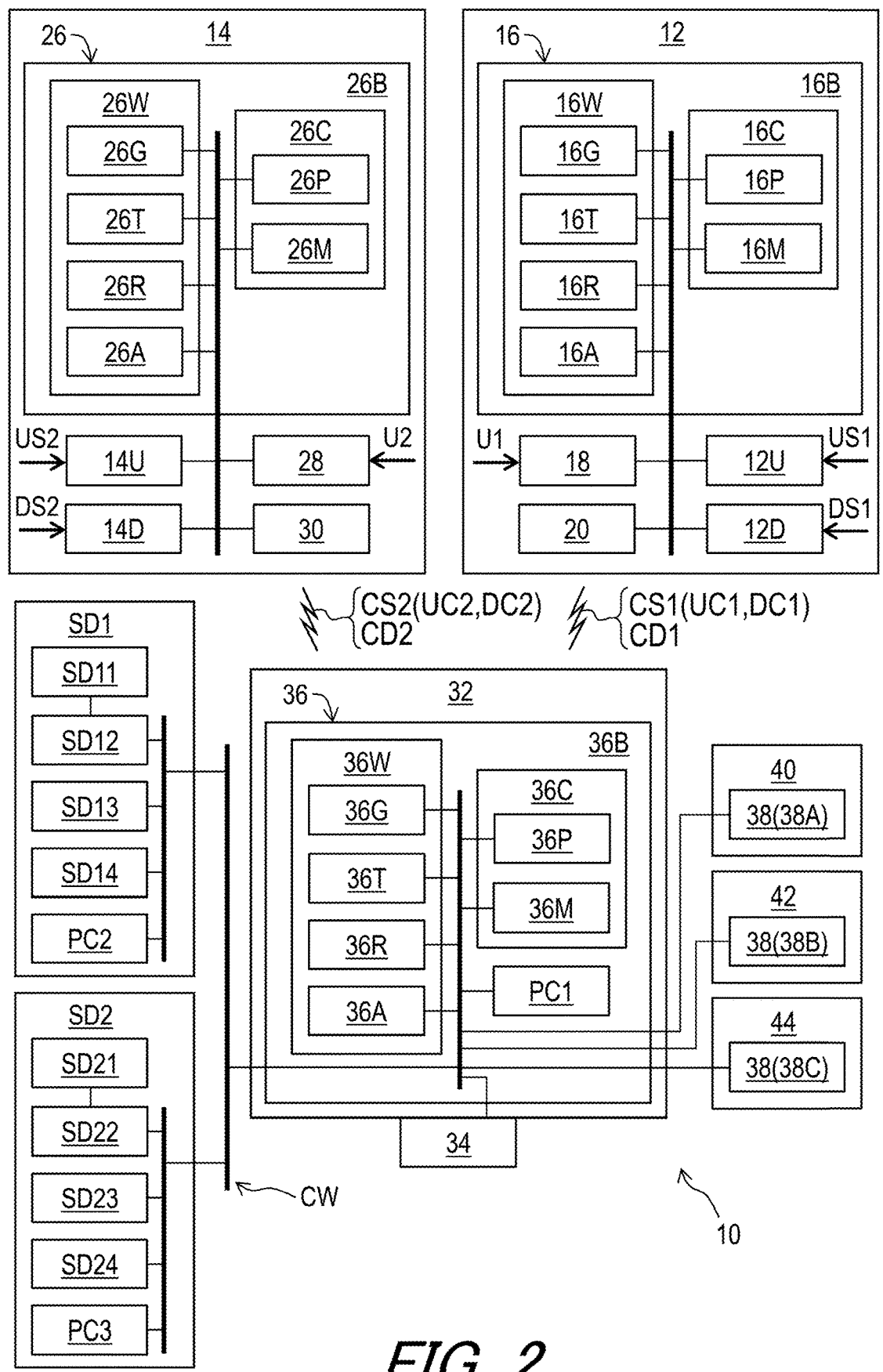
FIG. 2 is a schematic block diagram of the operating system of the human-powered vehicle illustrated in FIG. 1.

As seen in FIG. 2, the human-powered vehicle VH includes operating devices 12 and 14. The operating device 12 is configured to control the shift changing device SD1 to upshift or downshift in response to a user upshift input US1 or a user downshift input DS1. The operating device 14 is configured to control the shift changing device SD2 to upshift or downshift in response to a user upshift input US2 or a user downshift input DS2.

Figure 3:
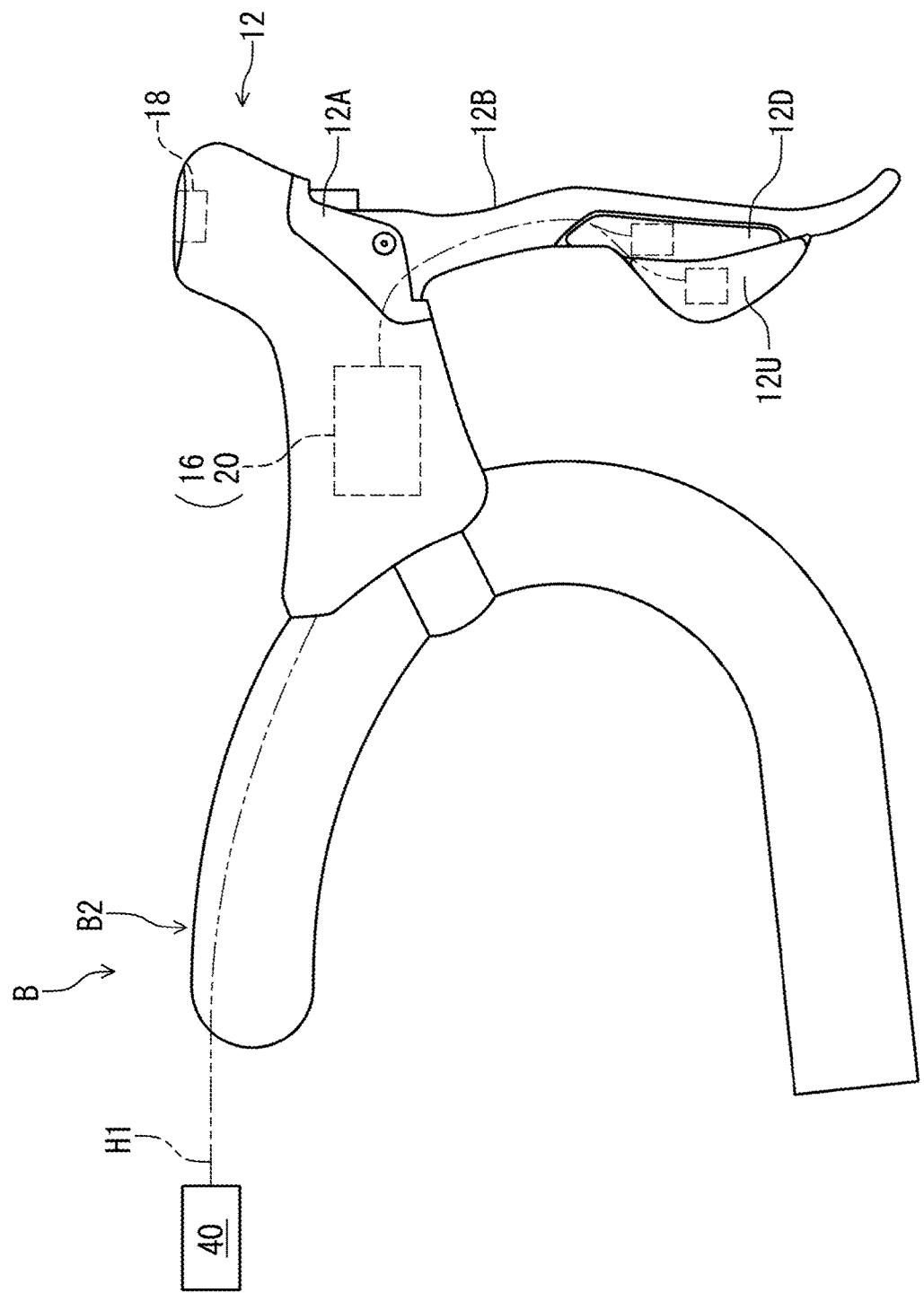
FIG. 3 is a side elevational view of an operating device of the operating system illustrated in FIG. 2.

As seen in FIG. 3, the operating device 12 includes an upshift switch 12U and a downshift switch 12D. The upshift switch 12U is configured to receive the user upshift input US1. The downshift switch 12D is configured to receive the user downshift input DS1. The operating device 12 includes a base member 12A and an operating member 12B. The base member 12A is configured to be mounted to the handlebar B2. The operating member 12B is pivotally coupled to the base member 12A. The upshift switch 12U and the downshift switch 12D are attached to the operating member 12B.

Figure 4:
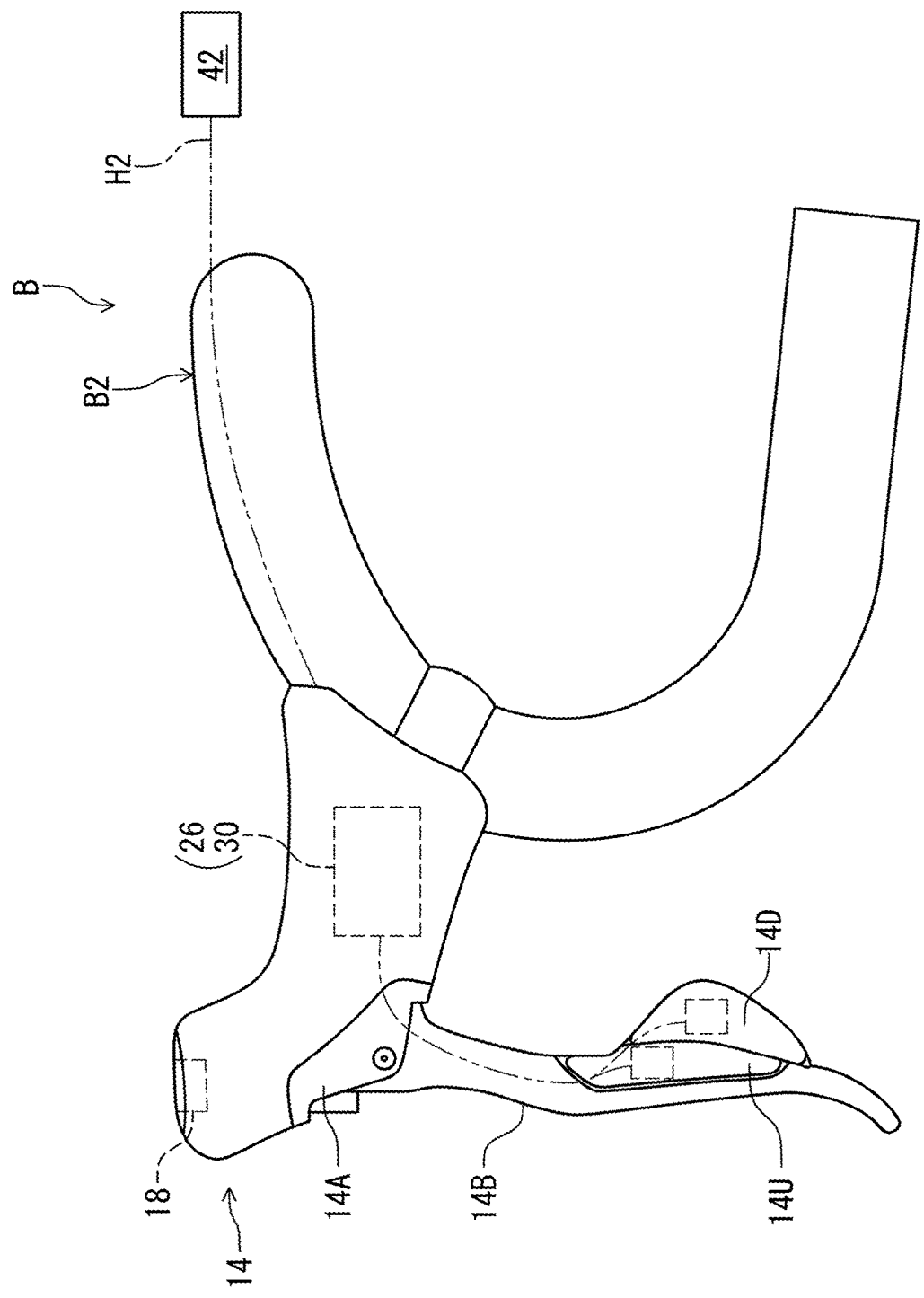
FIG. 4 is a side elevational view of an operating device of the operating system illustrated in FIG. 2.

As seen in FIG. 4, the operating device 14 includes an upshift switch 14U and a downshift switch 14D. The upshift switch 14U is configured to receive the user upshift input US2. The downshift switch 14D is configured to receive the user downshift input DS2. The downshift switch 14D is configured to receive the user downshift input DS1. The operating device 14 includes a base member 14A and an operating member 14B. The base member 14A is configured to be mounted to the handlebar B2. The operating member 14B is pivotally coupled to the base member 14A. The upshift switch 14U and the downshift switch 14D are attached to the operating member 14B.

As seen in FIG. 2, the operating system 10 for the human-powered vehicle VH comprises a wireless communication device 16. In this embodiment, the wireless communication device 16 is provided in the operating device 12. As seen in FIG. 3, the wireless communication device 16 is provided in the base member 12A of the operating device 12. However, the wireless communication device 16 can be provided at other locations or in another device.

As seen in FIG. 2, the wireless communication device 16 for the human-powered vehicle VH comprises a wireless communicator 16W and a controller 16C. The wireless communicator 16W is configured to wirelessly communicate with an additional wireless communicator.

In this embodiment, the wireless communication device 16 includes a circuit board 16B. The controller 16C includes a processor 16P and a memory 16M which are electrically mounted on the circuit board 16B. The processor 16P includes a central processing unit (CPU) and a memory controller. The memory 16M is connected to the processor 16P. The memory 16M includes a read only memory (ROM) and a random-access memory (RAM). The ROM includes a non-transitory computer-readable storage medium. The RAM includes a transitory computer-readable storage medium. The memory 16M includes storage areas each having an address in the ROM and the RAM. The processor 16P controls the memory 16M to store data in the storage areas of the memory 16M and reads data from the storage areas of the memory 16M. The memory 16M (e.g., the ROM) stores a program. The program is read into the processor 16P, and thereby algorithms of the wireless communication device 16.

The wireless communicator 16W includes a signal generating circuit 16G, a signal transmitting circuit 16T, a signal receiving circuit 16R, and an antenna 16A. The signal generating circuit 16G generates wireless signals (e.g., a shift control signal CS1 such as an upshift control signal UC1 or a downshift control signal DC1) based on each of the user upshift input US1 and the user downshift input DS1 received by the upshift and downshift switches 12U and 12D of the operating device 12. The signal generating circuit 16G superimposes digital signals on carrier wave using a predetermined wireless communication protocol to generate the wireless signals. The signal transmitting circuit 16T transmits the wireless signal via the antenna 16A in response to the electric signal which is input from each of the upshift and downshift switches 12U and 12D. In this embodiment, the signal generating circuit 16G can encrypt control information (e.g., shift information) to generate encrypted wireless signals. The signal generating circuit 16G encrypts digital signals stored in the memory 16M using a cryptographic key. The signal transmitting circuit 16T transmits the encrypted wireless signals. Thus, the wireless communication device 16 wirelessly transmits the wireless signal to establish wireless communication.

Further, the signal receiving circuit 16R receives a wireless signal (e.g., a connection demand signal CD1) from the additional wireless communication device via the antenna 16A. In this embodiment, the signal receiving circuit 16R decodes the wireless signal to recognize information wirelessly transmitted from the additional wireless communication device. The signal receiving circuit 16R may decrypt the encrypted wireless signal using the cryptographic key. Namely, the wireless communication device 16 is configured to transmit a wireless signal to control an additional electrical component and to receive a wireless signal to recognize information from the additional electrical component. In other words, the wireless communication device 16 is provided as a wireless transmitter and a wireless receiver. In this embodiment, the wireless communication device 16 is integrally provided as a single unit. However, the wireless communication device 16 can be constituted of a wireless transmitter and a wireless receiver which are provided as separate units arranged at different positions from each other.

The wireless communication device 16 further comprises at least one switch 18. The at least one switch 18 is configured to change the state of the at least one switch 18 in response to a user input U1. In this embodiment, the wireless communication device 16 further comprises the switch 18. The switch 18 is configured to change the state of the switch 18 in response to the user input U1. However, the switch 18 can be attached to other devices provided separately from the wireless communication device 16.

In this embodiment, the at least one switch 18 includes a switch circuit having a contact. The at least one switch 18 is configured to connect and disconnect the contact in response to the user input U1. The at least one switch 18 includes a normally-open switch. However, the structure of the switch 18 is not limited to this embodiment.

The wireless communication device 16 further comprises a power supply 20. The power supply 20 is electrically connected to the wireless communication device 16 to supply electricity to the wireless communication device 16. Examples of the power supply 20 include a battery and a piezoelectric device generating power in response to the operation of one of the upshift and downshift switches 12U and 12D.

As seen in FIG. 2, the operating system 10 for the human-powered vehicle VH comprises a wireless communication device 26. In this embodiment, the wireless communication device 26 is provided in the operating device 12. As seen in FIG. 4, the wireless communication device 26 is provided in the base member 14A of the operating device 14. However, the wireless communication device 26 can be provided at other locations or in another device.

As seen in FIG. 2, the wireless communication device 26 for the human-powered vehicle VH comprises a wireless communicator 26W and a controller 26C. The wireless communicator 26W is configured to wirelessly communicate with an additional wireless communicator.

In this embodiment, the wireless communication device 26 includes a circuit board 26B. The controller 26C includes a processor 26P and a memory 26M which are electrically mounted on the circuit board 26B. The processor 26P includes a central processing unit (CPU) and a memory controller. The memory 26M is connected to the processor 26P. The memory 26M includes a read only memory (ROM) and a random-access memory (RAM). The ROM includes a non-transitory computer-readable storage medium. The RAM includes a transitory computer-readable storage medium. The memory 26M includes storage areas each having an address in the ROM and the RAM. The processor 26P controls the memory 26M to store data in the storage areas of the memory 26M and reads data from the storage areas of the memory 26M. The memory 26M (e.g., the ROM) stores a program. The program is read into the processor 26P, and thereby algorithms of the wireless communication device 26.

The wireless communicator 26W includes a signal generating circuit 26G, a signal transmitting circuit 26T, a signal receiving circuit 26R, and an antenna 26A. The signal generating circuit 26G generates wireless signals (e.g., a shift control signal CS2 such as an upshift control signal UC2 or a downshift control signal DC2) based on each of the user upshift input US2 and the user downshift input DS2 received by the upshift and downshift switches 14U and 14D of the operating device 14. The signal generating circuit 26G superimposes digital signals on carrier wave using a predetermined wireless communication protocol to generate the wireless signals. The signal transmitting circuit 26T transmits the wireless signal via the antenna 26A in response to the electric signal which is input from each of the upshift and downshift switches 14U and 14D. In this embodiment, the signal generating circuit 26G can encrypt control information (e.g., shift information) to generate encrypted wireless signals. The signal generating circuit 26G encrypts digital signals stored in the memory 26M using a cryptographic key. The signal transmitting circuit 26T transmits the encrypted wireless signals. Thus, the wireless communication device 26 wirelessly transmits the wireless signal to establish wireless communication.

Further, the signal receiving circuit 26R receives a wireless signal (e.g., a connection demand signal CD2) from the additional wireless communication device via the antenna 26A. In this embodiment, the signal receiving circuit 26R decodes the wireless signal to recognize information wirelessly transmitted from the additional wireless communication device. The signal receiving circuit 26R may decrypt the encrypted wireless signal using the cryptographic key. Namely, the wireless communication device 26 is configured to transmit a wireless signal to control an additional electrical component and to receive a wireless signal to recognize information from the additional electrical component. In other words, the wireless communication device 26 is provided as a wireless transmitter and a wireless receiver. In this embodiment, the wireless communication device 26 is integrally provided as a single unit. However, the wireless communication device 26 can be constituted of a wireless transmitter and a wireless receiver which are provided as separate units arranged at different positions from each other.

The wireless communication device 26 further comprises at least one switch 28. The at least one switch 28 is configured to change the state of the at least one switch 28 in response to a user input U2. In this embodiment, the wireless communication device 26 further comprises the switch 28. The switch 28 is configured to change the state of the switch 28 in response to the user input U2. However, the switch 28 can be attached to other devices provided separately from the wireless communication device 26.

In this embodiment, the at least one switch 28 includes a switch circuit having a contact. The at least one switch 28 is configured to connect and disconnect the contact in response to the user input U2. The at least one switch 28 includes a normally-open switch. However, the structure of the switch 28 is not limited to this embodiment.

The wireless communication device 26 further comprises a power supply 30. The power supply 30 is electrically connected to the wireless communication device 26 to supply electricity to the wireless communication device 26. Examples of the power supply 30 include a battery and a piezoelectric device generating power in response to the operation of the upshift and downshift switches 14U and 14D.

As seen in FIG. 1, the human-powered vehicle VH includes a master unit 32 and a power supply 34. The master unit 32 is attached to the vehicle body B. The power supply 34 is mounted on the master unit 32. As seen in FIG. 2, the master unit 32 is electrically connected to the shift changing devices SD1 and SD2 and the power supply 34 with an electrical communication wiring CW. Examples of the power supply 34 include a battery. The power supply 34 is configured to supply electricity to the master unit 32 and the shift changing devices SD1 and SD2 through the electrical communication wiring CW.

As seen in FIG. 2, the operating system 10 for the human-powered vehicle VH comprises a wireless communication device 36 and at least one switch 38. The wireless communication device 36 is configured to wirelessly communicate with the wireless communication device 16 of the operating device 12 and the wireless communication device 26 of the operating device 14. In this embodiment, the wireless communication device 36 is provided in the master unit 32. However, the wireless communication device 36 can be provided in another device.

The at least one switch 38 is attached to a separate component which is provided separately from the wireless communication device 36. In this embodiment, the operating system 10 further comprises a brake caliper 40 provided as the separate component. The operating system 10 further comprises a brake caliper 42 provided as the separate component. The operating system 10 further comprises a seatpost 44 provided as the separate component.

The at least one switch 38 includes a plurality of switches 38A, 38B, and 38C. The switch 38A is attached to the brake caliper 40. The switch 38B is attached to the brake caliper 42. The switch 38C is attached to the seatpost 44.

The at least one switch 38 is configured to change the state of the at least one switch 38 in response to a user input. The switch 38A is configured to change the state of the switch 38A in response to a user input. The switch 38B is configured to change the state of the switch 38B in response to a user input. The switch 38C is configured to change the state of the switch 38C in response to a user input.

In this embodiment, the switch 38A includes a switch circuit having a contact. The switch 38A is configured to connect and disconnect the contact in response to the user input. The switch 38B includes a switch circuit having a contact. The switch 38B is configured to connect and disconnect the contact in response to the user input. The switch 38C includes a switch circuit having a contact. The switch 38C is configured to connect and disconnect the contact in response to the user input. Each of the switches 38A, 38B, and 38C includes a normally-open switch. However, the structures of the switches 38A, 38B, and 38C are not limited to this embodiment.

Figure 5:
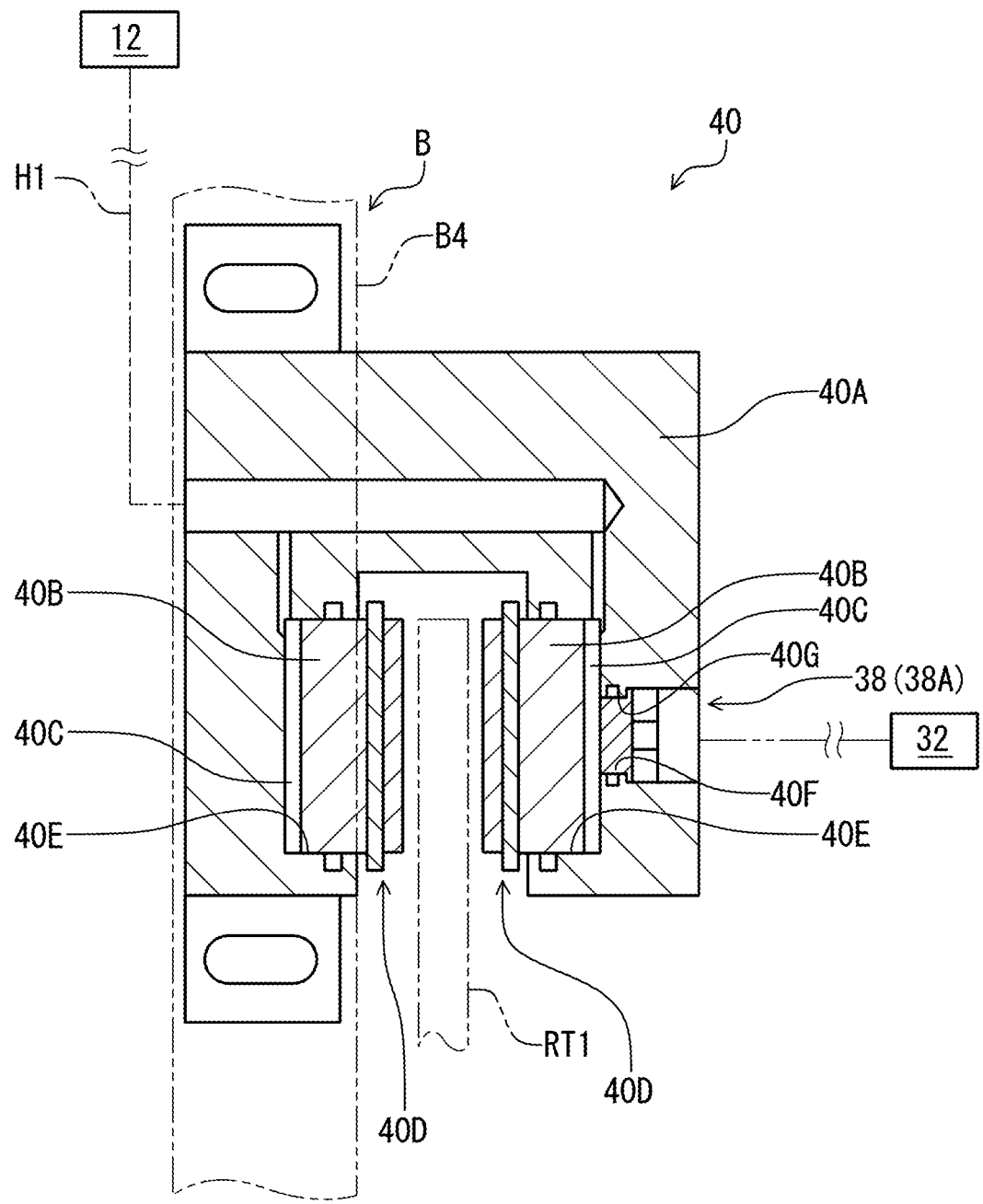
FIG. 5 is a cross-sectional view of a brake caliper of the operating system illustrated in FIG. 2.

As seen in FIG. 5, the at least one switch 38 is attached to the brake caliper 40 to change the state of the at least one switch 38 in response to an operating force applied to the brake caliper 40. The at least one switch 38 is attached to the brake caliper 40 to change the state of the at least one switch 38 in response to a hydraulic pressure applied to the brake caliper 40 as the operating force. In this embodiment, the switch 38A is attached to the brake caliper 40 to change the state of the switch 38A in response to an operating force applied to the brake caliper 40. The switch 38A is attached to the brake caliper 40 to change the state of the switch 38A in response to a hydraulic pressure applied to the brake caliper 40 as the operating force.

The brake caliper 40 is configured to be actuated in response to the operation of the operating device 12. The brake caliper 40 includes a caliper body 40A, a pair of slave pistons 40B, a pair of slave chambers 40C, and a pair of friction members 40D. The caliper body 40A includes a pair of slave cylinder bores 40E and is secured to the front fork B4 of the vehicle body B. The slave piston 40B is movably provided in the slave cylinder bore 40E. The slave piston 40B and the slave cylinder bore 40E define the slave chamber 40C. The slave chamber 40C is filled with the hydraulic fluid. The friction member 40D is movably attached to the caliper body 40A. The slave piston 40B presses the friction member 40D toward a disc brake rotor RT1 in response to a hydraulic pressure transmitted to the slave chamber 40C. The pair of slave chambers 40C is in fluid communication with a master chamber of the operating device 12 with a hydraulic hose H1.

The switch 38A is secured to the caliper body 40A. The brake caliper 40 includes a switch piston 40F. The caliper body 40A includes an additional bore 40G. The switch piston 40F is movably provided in the additional bore 40G to press the switch 38A. Increase in the hydraulic pressure in the slave chamber 40C moves the switch piston 40F toward the switch 38A, activating the switch 38A.

Figure 6:
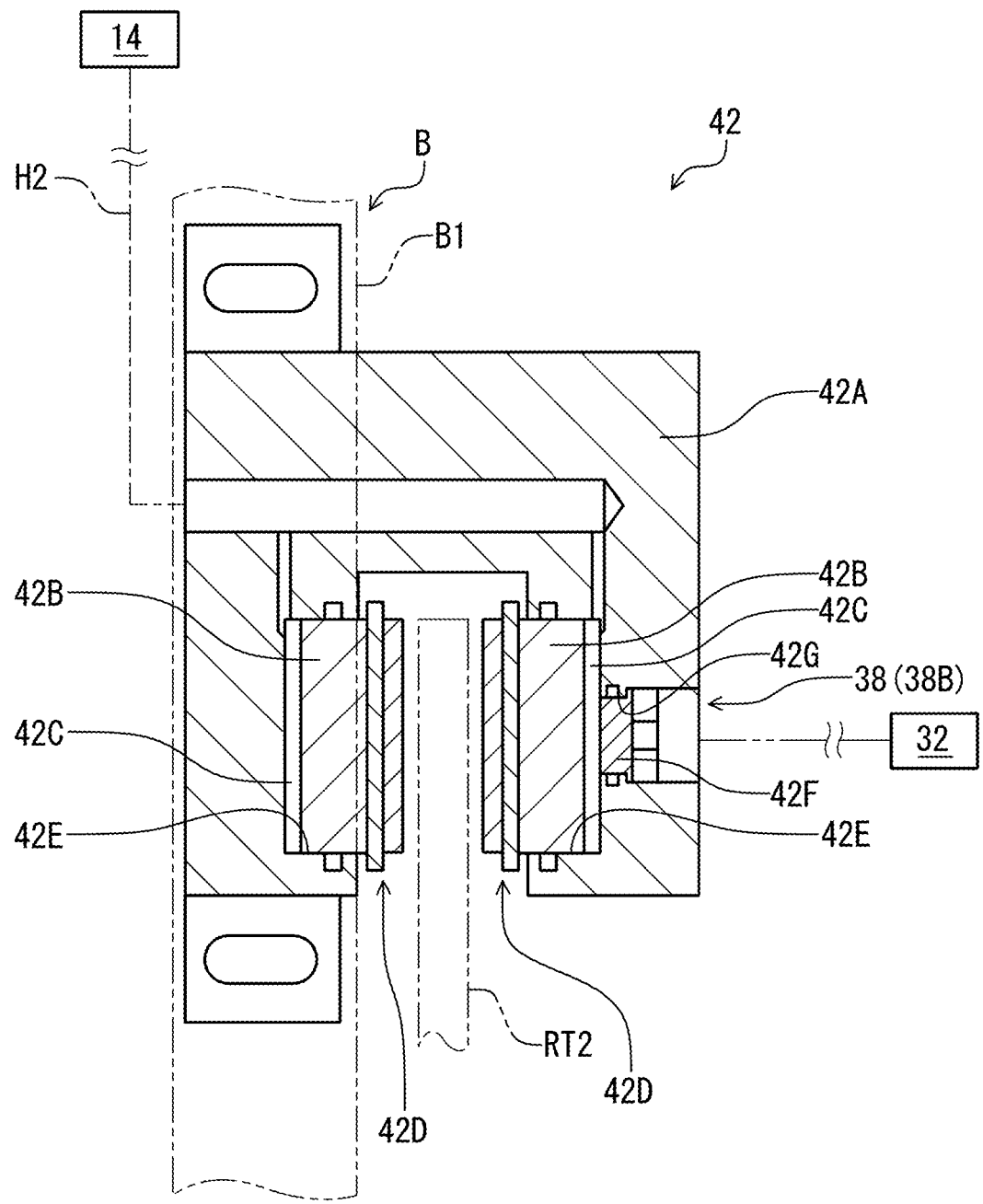
FIG. 6 is a cross-sectional view of a brake caliper of the operating system illustrated in FIG. 2.

As seen in FIG. 6, the at least one switch 38 is attached to the brake caliper 42 to change the state of the at least one switch 38 in response to an operating force applied to the brake caliper 42. The at least one switch 38 is attached to the brake caliper 42 to change the state of the at least one switch 38 in response to a hydraulic pressure applied to the brake caliper 42 as the operating force. In this embodiment, the switch 38B is attached to the brake caliper 42 to change the state of the switch 38B in response to an operating force applied to the brake caliper 42. The switch 38B is attached to the brake caliper 42 to change the state of the switch 38B in response to a hydraulic pressure applied to the brake caliper 42 as the operating force.

The brake caliper 42 is configured to be actuated in response to the operation of the operating device 14. The brake caliper 42 includes a caliper body 42A, a pair of slave pistons 42B, a pair of slave chambers 42C, and a pair of friction members 42D. The caliper body 42A includes a pair of slave cylinder bores 42E and is secured to the front fork B4 of the vehicle body B. The slave piston 42B is movably provided in the slave cylinder bore 42E. The slave piston 42B and the slave cylinder bore 42E define the slave chamber 42C. The slave chamber 42C is filled with the hydraulic fluid. The friction member 42D is movably attached to the caliper body 42A. The slave piston 42B presses the friction member 42D toward a disc brake rotor RT2 in response to a hydraulic pressure transmitted to the slave chamber 42C. The pair of slave chambers 42C is in fluid communication with a master chamber of the operating device 12 with a hydraulic hose H2.

The switch 38B is secured to the caliper body 42A. The brake caliper 42 includes a switch piston 42F. The caliper body 42A includes an additional bore 42G. The switch piston 42F is movably provided in the additional bore 42G to press the switch 38B. Increase in the hydraulic pressure in the slave chamber 42C moves the switch piston 42F toward the switch 38B, activating the switch 38B.

Figure 7:
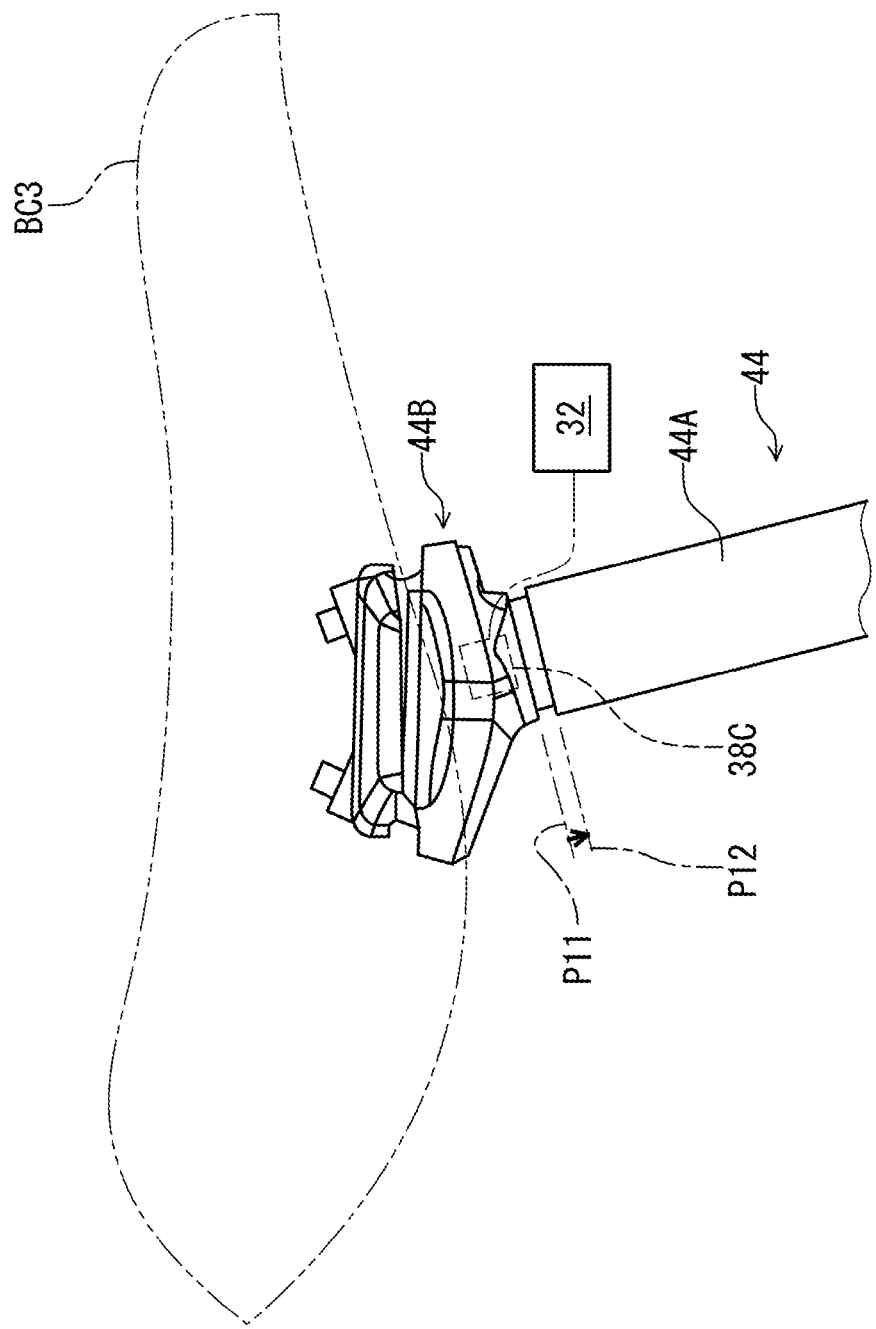
FIG. 7 is a side elevational view of a seatpost of the operating system illustrated in FIG. 2.

As seen in FIG. 7, the at least one switch 38 is attached to the seatpost 44 to change the state of the at least one switch 38 in response to a user's weight applied to the seatpost 44. In this embodiment, the switch 38C is attached to the seatpost 44 to change the state of the switch 38 in response to the user's weight applied to the seatpost.

The seatpost includes a tubular body 44A and a saddle attachment structure 44B. The saddle attachment structure 44B is mounted on the tubular body 44A. The saddle BC3 is attached to the saddle attachment structure 44B. The saddle attachment structure 44B is movably coupled to the tubular body 44A in response to the user's weight applied to the saddle attachment structure 44B. The saddle attachment structure 44B is movable relative to the tubular body 44A between a rest position P11 and an actuated position P12. The saddle attachment structure 44B moves relative to the tubular body 44A from the rest position P11 to the actuated position P12 in response to the user's weight.

The switch 38C is attached to one of the tubular body 44A and the saddle attachment structure 44B. The switch 38 is activated while the saddle attachment structure 44B is in the actuated position P12. The seatpost 44 includes a biasing member to bias the saddle attachment structure 44B toward the rest position P11. Thus, the switch 38 is not activated when the seatpost does not receive the user's weight.

As seen in FIG. 2, the wireless communication device 36 for the human-powered vehicle VH comprises a wireless communicator 36W and a controller 36C. The wireless communicator 36W is configured to wirelessly communicate with an additional wireless communicator. In this embodiment, the wireless communicator 36W is configured to wirelessly receive the shift control signal CS1 to change a shift position of the shift changing device SD1 from the additional wireless communicator 16W of the operating device 12. The wireless communicator 36W is configured to wirelessly receive the shift control signal CS2 to change a shift position of the shift changing device SD2 from the additional wireless communicator 26W of the operating device 14.

In this embodiment, the wireless communication device 36 includes a circuit board 36B. The controller 36C includes a processor 36P and a memory 36M which are electrically mounted on the circuit board 36B. The processor 36P includes a central processing unit (CPU) and a memory controller. The memory 36M is connected to the processor 36P. The memory 36M includes a read only memory (ROM) and a random-access memory (RAM). The ROM includes a non-transitory computer-readable storage medium. The RAM includes a transitory computer-readable storage medium. The memory 36M includes storage areas each having an address in the ROM and the RAM. The processor 36P controls the memory 36M to store data in the storage areas of the memory 36M and reads data from the storage areas of the memory 36M. The memory 36M (e.g., the ROM) stores a program. The program is read into the processor 36P, and thereby algorithms of the wireless communication device 36.

The wireless communicator 36W includes a signal generating circuit 36G, a signal transmitting circuit 36T, a signal receiving circuit 36R, and an antenna 36A. The signal generating circuit 36G generates wireless signals (e.g., the connection demand signals CD1 and CD2) based on commands generated by the controller 36C. The signal generating circuit 36G superimposes digital signals on carrier wave using a predetermined wireless communication protocol to generate the wireless signals. The signal transmitting circuit 36T transmits the wireless signal via the antenna 36A in response to the commands generated by the controller 36C. In this embodiment, the signal generating circuit 36G can encrypt control information (e.g., shift information) to generate encrypted wireless signals. The signal generating circuit 36G encrypts digital signals stored in the memory 36M using a cryptographic key. The signal transmitting circuit 36T transmits the encrypted wireless signals. Thus, the wireless communication device 36 wirelessly transmits the wireless signal to establish wireless communication.

Further, the signal receiving circuit 36R receives wireless signals (e.g., the shift control signal CS1 or CS2) from each of the operating devices 12 and 14 via the antenna 36A. In this embodiment, the signal receiving circuit 36R decodes the wireless signal to recognize information wirelessly transmitted from each of the operating devices 12 and 14. The signal receiving circuit 36R may decrypt the encrypted wireless signal using the cryptographic key. Namely, the wireless communication device 36 is configured to transmit a wireless signal to control an additional electrical component and to receive a wireless signal to recognize information from the additional electrical component. In other words, the wireless communication device 36 is provided as a wireless transmitter and a wireless receiver. In this embodiment, the wireless communication device 36 is integrally provided as a single unit. However, the wireless communication device 36 can be constituted of a wireless transmitter and a wireless receiver which are provided as separate units arranged at different positions from each other.

In this embodiment, the master unit 32 and the shift changing devices SD1 and SD2 can communicate with each other through a voltage line using power line communication technology. The power line communication technology is used for communicating between electrical components. Power line communication (PLC) carries data on a conductor that is also used simultaneously for electric power transmission or electric power distribution to the electrical component. In this embodiment, the electric power is supplied from the power supply 34 to the master unit 32 and the shift changing devices SD1 and SD2 through the electrical communication wiring CW. Furthermore, the master unit 32 and the shift changing devices SD1 and SD2 can receive information signals from each other through the electrical communication wiring CW using the PLC.

The PLC uses unique identifying information such as a unique identifier that is assigned to each of electrical components. Each of the shift changing devices SD1 and SD2 is configured to store the unique identifying information. Based on the unique identifying information, the shift changing devices SD1 and SD2 can recognize, based on the unique identifying information, information signals which are necessary for itself among information signals transmitted via the electrical communication wiring CW. For example, the master unit 32 and the shift changing devices SD1 and SD2 can recognize information signals transmitted from the master unit 32 and the shift changing devices SD1 and SD2 through the electrical communication wiring CW. Instead of using the PLC technology, however, separate signal wires can be provided for transmitting data in addition to the ground wire and the voltage wire if needed and/or desired.

The wireless communication device 36 comprises a PLC controller PC1. The PLC controller PC1 is electrically connected to the wireless communicator 36W. The PLC controller PC1 is connected to the electrical communication wiring CW. The PLC controller PC1 is configured to separate input signals to a power source voltage and control signals. The PLC controller PC1 is configured to regulate the power source voltage to a level at which the wireless communicator 36W can properly operate. The PLC controller PC1 is further configured to superimpose output signals such as the upshift control signal UC1, the downshift control signal DC1, the upshift control signal UC2, and the downshift control signal DC2 on the power source voltage applied to the electrical communication wiring CW from the power supply 34.

As seen in FIG. 2, the shift changing device SD1 includes a chain guide SD11, an motor SD12, a shift position sensor SD13, and a motor driver SD14. The motor SD12, the shift position sensor SD13, and the motor driver SD14 are connected to each other. The motor SD12 is mechanically coupled to the chain guide SD11. The motor SD12 is configured to move the chain guide SD11 to shift the chain C relative to the rear sprocket assembly BC2 (FIG. 1). In this embodiment, the motor SD12 includes a direct-current (DC) motor. The motor SD12 includes a rotational shaft (not shown) to output a rotational force. The rotational shaft is coupled to the chain guide SD11 via a gear reducer (not shown). Other examples of the motor SD12 include a stepper motor and an alternating-current (AC) motor.

The shift position sensor SD13 is configured to sense a position of the motor SD12 as the shift position of the shift changing device SD1. In this embodiment, the shift position sensor SD13 is a contact rotational position sensor such as a potentiometer. The shift position sensor SD13 is configured to sense an absolute rotational position of the rotational shaft of the motor SD12 as the shift position of the shift changing device SD1. Other examples of the shift position sensor SD13 include a non-contact rotational position sensor such as an optical sensor (e.g., a rotary encoder) and a magnetic sensor (e.g., a hall sensor).

The shift position sensor SD13 is electrically connected to the motor driver SD14. The motor driver SD14 is configured to control the motor SD12 based on the rear shift position sensed by the shift position sensor SD13. Specifically, the motor driver SD14 is electrically connected to the motor SD12. The motor driver SD14 is configured to control a rotational direction and a rotational speed of the rotational shaft based on the shift position and each of the upshift control signal UC1, the downshift control signal DC1, the upshift control signal UC2, and the downshift control signal DC2. Furthermore, the motor driver SD14 is configured to stop rotation of the rotational shaft to position the chain guide SD11 at one of the low to top gear positions based on the shift position and each of the upshift control signal UC1, the downshift control signal DC1, the upshift control signal UC2, and the downshift control signal DC2.

The shift changing device SD1 includes a PLC controller PC2. The PLC controller PC2 is electrically connected to the motor driver SD14. The PLC controller PC2 is connected to the electrical communication wiring CW. The PLC controller PC2 is configured to separate input signals to a power source voltage and control signals such as the upshift control signal UC1, the downshift control signal DC1, the upshift control signal UC2, and the downshift control signal DC2. The PLC controller PC2 is configured to regulate the power source voltage to a level at which the motor driver SD14 can properly operate.

As seen in FIG. 2, the shift changing device SD2 includes a chain guide SD21, an motor SD22, a shift position sensor SD23, and a motor driver SD24. The motor SD22, the shift position sensor SD23, and the motor driver SD24 are connected to each other. The motor SD22 is mechanically coupled to the chain guide SD21. The motor SD22 is configured to move the chain guide SD21 to shift the chain C relative to the rear sprocket assembly BC2 (FIG. 1). In this embodiment, the motor SD22 includes a direct-current (DC) motor. The motor SD22 includes a rotational shaft (not shown) to output a rotational force. The rotational shaft is coupled to the chain guide SD21 via a gear reducer (not shown). Other examples of the motor SD22 include a stepper motor and an alternating-current (AC) motor.

The shift position sensor SD23 is configured to sense a position of the motor SD22 as the shift position of the shift changing device SD2. In this embodiment, the shift position sensor SD23 is a contact rotational position sensor such as a potentiometer. The shift position sensor SD23 is configured to sense an absolute rotational position of the rotational shaft of the motor SD22 as the shift position of the shift changing device SD2. Other examples of the shift position sensor SD23 include a non-contact rotational position sensor such as an optical sensor (e.g., a rotary encoder) and a magnetic sensor (e.g., a hall sensor).

The shift position sensor SD23 is electrically connected to the motor driver SD24. The motor driver SD24 is configured to control the motor SD22 based on the rear shift position sensed by the shift position sensor SD23. Specifically, the motor driver SD24 is electrically connected to the motor SD22. The motor driver SD24 is configured to control a rotational direction and a rotational speed of the rotational shaft based on the shift position and each of the upshift control signal UC1, the downshift control signal DC1, the upshift control signal UC2, and the downshift control signal DC2. Furthermore, the motor driver SD24 is configured to stop rotation of the rotational shaft to position the chain guide SD21 at one of the low to top gear positions based on the shift position and each of the upshift control signal UC1, the downshift control signal DC1, the upshift control signal UC2, and the downshift control signal DC2.

The shift changing device SD2 includes a PLC controller PC3. The PLC controller PC3 is electrically connected to the motor driver SD24. The PLC controller PC3 is connected to the electrical communication wiring CW. The PLC controller PC3 is configured to separate input signals to a power source voltage and control signals such as the upshift control signal UC1, the downshift control signal DC1, the upshift control signal UC2, and the downshift control signal DC2. The PLC controller PC3 is configured to regulate the power source voltage to a level at which the motor driver SD24 can properly operate.

Figure 8:
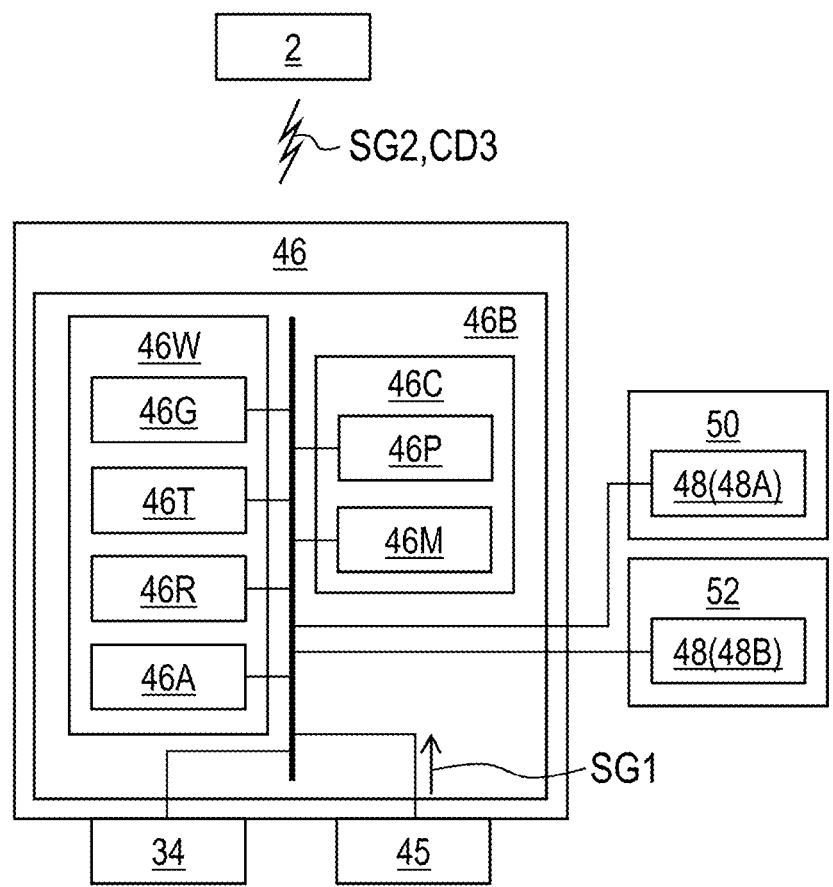
FIG. 8 is a schematic block diagram of a pedaling force sensor of the operating system illustrated in FIG. 2.

As seen in FIG. 8, the operating system 10 further comprises a pedaling force sensor 45 configured to sense a pedaling force applied to the crank BC1 to which a pedal is attached. The pedaling force sensor 45 is configured to generate an output signal SG1 indicating the pedaling force.

The operating system 10 for the human-powered vehicle VH comprises a wireless communication device 46 and at least one switch 48. The wireless communication device 46 is configured to wirelessly communicate with the notification device 2 to transmit the output signal indicating the pedaling force. In this embodiment, the wireless communication device 46 is provided in the crank BC1. However, the wireless communication device 46 can be provided in another device.

The at least one switch 48 is attached to a separate component which is provided separately from the wireless communication device 46. In this embodiment, the operating system 10 further comprises a pedal 50 provided as the separate component. The operating system 10 further comprises a pedal 52 provided as the separate component. The at least one switch 48 includes a plurality of switches 48A and 48B. The switch 48A is attached to the pedal 50. The switch 48B is attached to the pedal 52.

The at least one switch 48 is attached to the pedal 50 or 52 to change the state of the at least one switch 48 in response to a weight of a user's foot applied to the pedal 50 or 52. The switch 48A is attached to the pedal 50 to change the state of the switch 48A in response to the weight of the user's foot applied to the pedal 50. The switch 48B is attached to the pedal 52 to change the state of the switch 48B in response to the weight of the user's foot applied to the pedal 52.

In this embodiment, the switch 48A includes a switch circuit having a contact. The switch 48A is configured to connect and disconnect the contact in response to the user input. The switch 48B includes a switch circuit having a contact. The switch 48B is configured to connect and disconnect the contact in response to the user input. The switch 48C includes a switch circuit having a contact. Each of the switches 48A and 48B includes a normally-open switch. However, the structures of the switches 48A and 48B are not limited to this embodiment.

Figure 9:
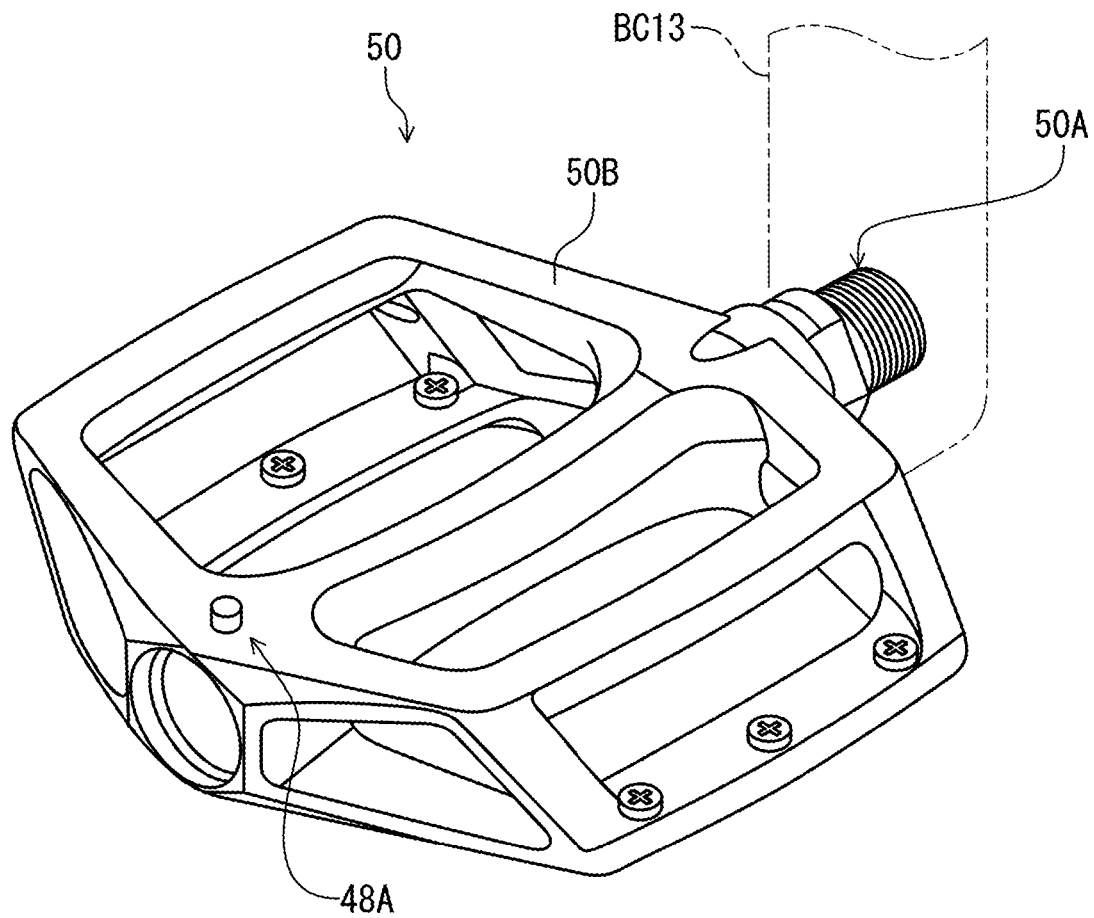
FIG. 9 is a perspective view of a pedal of the operating system illustrated in FIG. 2.

As seen in FIG. 9, the pedal 50 includes a pedal axle 50A and a pedal body 50B. The pedal axle 50A is configured to be secured to the crank arm BC13. The pedal body 50B is rotatably coupled to the pedal axle 50A. The switch 48A is attached to the pedal body 50B.

Figure 10:
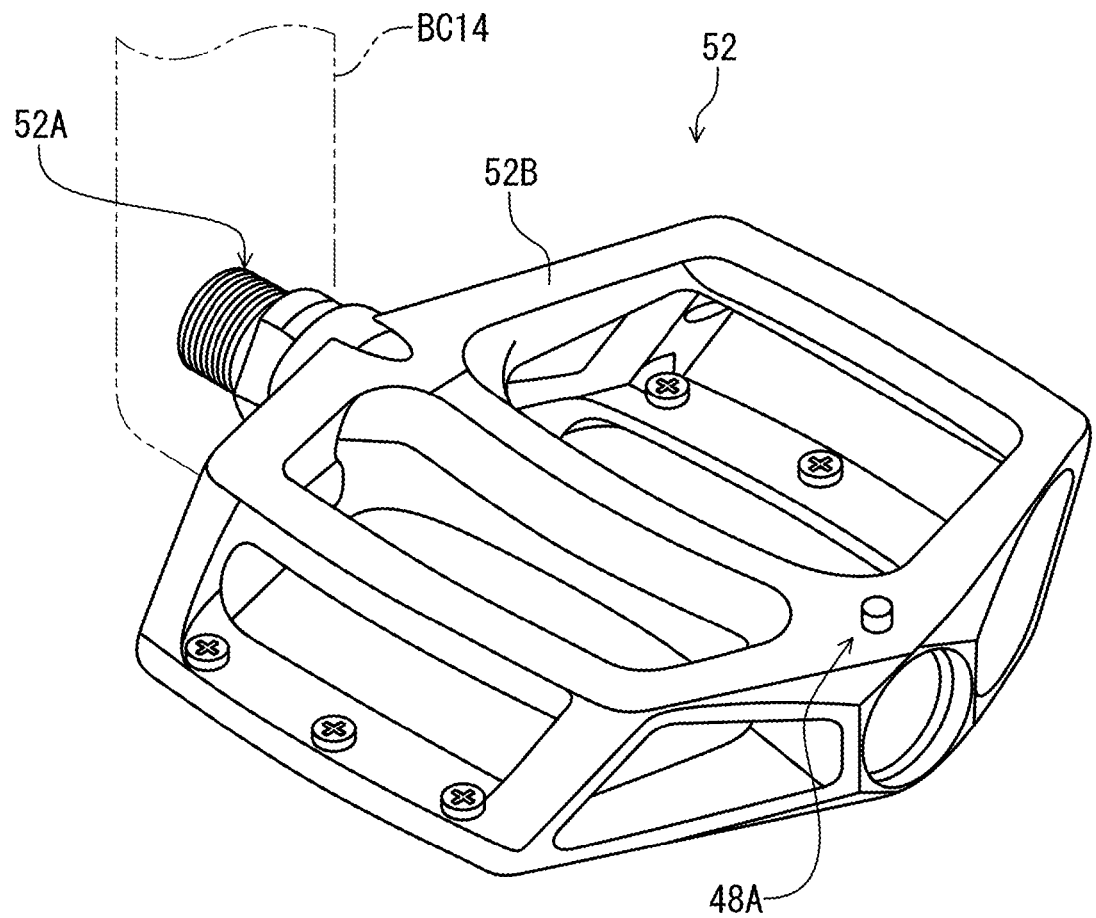
FIG. 10 is a perspective view of a pedal of the operating system illustrated in FIG. 2.

As seen in FIG. 10, the pedal 52 includes a pedal axle 52A and a pedal body 52B. The pedal axle 52A is configured to be secured to the crank arm BC14. The pedal body 52B is rotatably coupled to the pedal axle 52A. The switch 48B is attached to the pedal body 52B.

As seen in FIG. 8, the wireless communication device 46 for the human-powered vehicle VH comprises a wireless communicator 46W and a controller 46C. The wireless communicator 46W is configured to wirelessly communicate with an additional wireless communicator. The wireless communicator 46W is configured to wirelessly transmit the output signal SG1 to the additional wireless communicator of the notification device 2.

In this embodiment, the wireless communication device 46 includes a circuit board 46B. The controller 46C includes a processor 46P and a memory 46M which are electrically mounted on the circuit board 46B. The processor 46P includes a central processing unit (CPU) and a memory controller. The memory 46M is connected to the processor 46P. The memory 46M includes a read only memory (ROM) and a random-access memory (RAM). The ROM includes a non-transitory computer-readable storage medium. The RAM includes a transitory computer-readable storage medium. The memory 46M includes storage areas each having an address in the ROM and the RAM. The processor 46P controls the memory 46M to store data in the storage areas of the memory 46M and reads data from the storage areas of the memory 46M. The memory 46M (e.g., the ROM) stores a program. The program is read into the processor 46P, and thereby algorithms of the wireless communication device 46.

The wireless communicator 46W includes a signal generating circuit 46G, a signal transmitting circuit 46T, a signal receiving circuit 46R, and an antenna 46A. The signal generating circuit 46G generates wireless signals (e.g., an information signal SG2) based on the output signal SG1 generated by the pedaling force sensor 45. The signal generating circuit 46G superimposes digital signals on carrier wave using a predetermined wireless communication protocol to generate the wireless signal SG2. The signal transmitting circuit 46T transmits the wireless signal via the antenna 46A in response to the output signal SG1 generated by the pedaling force sensor 45. In this embodiment, the signal generating circuit 46G can encrypt control information (e.g., shift information) to generate encrypted wireless signals. The signal generating circuit 46G encrypts digital signals stored in the memory 46M using a cryptographic key. The signal transmitting circuit 46T transmits the encrypted wireless signals. Thus, the wireless communication device 46 wirelessly transmits the wireless signal to establish wireless communication.

Further, the signal receiving circuit 46R receives a wireless signal (e.g., a connection demand signal CD3) from the notification device 2 via the antenna 46A. In this embodiment, the signal receiving circuit 46R decodes the wireless signal to recognize information wirelessly transmitted from the notification device 2. The signal receiving circuit 46R may decrypt the encrypted wireless signal using the cryptographic key. Namely, the wireless communication device 46 is configured to transmit a wireless signal to control an additional electrical component and to receive a wireless signal to recognize information from the additional electrical component. In other words, the wireless communication device 46 is provided as a wireless transmitter and a wireless receiver. In this embodiment, the wireless communication device 46 is integrally provided as a single unit. However, the wireless communication device 46 can be constituted of a wireless transmitter and a wireless receiver which are provided as separate units arranged at different positions from each other.

Figure 11:
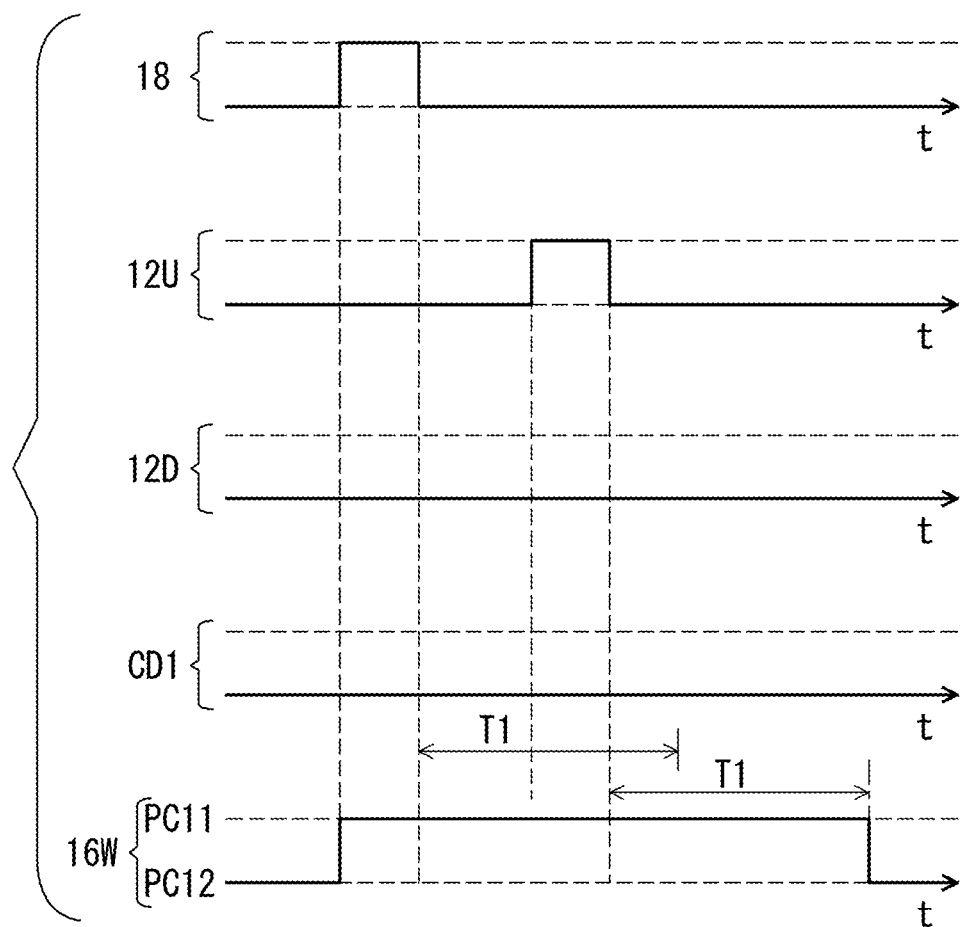
FIG. 11 is a timing chart of an operation of the operating system illustrated in FIG. 2.

As seen in FIG. 11, the wireless communicator 16W has a first mode in which the wireless communicator 16W operates under a first power consumption PC11 and a second mode in which the wireless communicator 16W operates under a second power consumption PC12 which is lower than the first power consumption PC11. The second power consumption PC12 is higher than zero. The second mode can also be referred to as a sleep mode. The controller 16C is configured to detect a change in the state of the at least one switch 18. The controller 16C is configured to detect an activation of the at least one switch 18 in response to the change in the state of the at least one switch 18. The controller 16C is configured to set the wireless communicator 16W with the first mode if the controller 16C detects the change in the state of the at least one switch 18 as the wireless communicator 16W is in the second mode. The controller 16C is configured to set the wireless communicator 16W with the first mode if the controller 16C detects the activation of the at least one switch 18.

In this embodiment, the controller 16C is configured to detect a change in the state of the switch 18. The controller 16C is configured to detect an activation of the switch 18 in response to the change in the state of the switch 18. The controller 16C is configured to set the wireless communicator 16W with the first mode if the controller 16C detects the change in the state of the switch 18 as the wireless communicator 16W is in the second mode. The controller 16C is configured to set the wireless communicator 16W with the first mode if the controller 16C detects the activation of the switch 18.

The controller 16C is configured to set the wireless communicator 16W with the second mode if the wireless communicator 16W does not receive a communication signal in the first mode. In this embodiment, the controller 16C is configured to set the wireless communicator 16W with the second mode if the wireless communicator 16W does not receive the communication signal in the first mode during a determination time T1. The communication signal includes a signal transmitted from the switch 18, the upshift switch 12U, and/or the downshift switch 12D. Thus, the controller 16C is configured to set the wireless communicator 16W with the second mode if the wireless communicator 16W does not receive the signal from both the upshift switch 12U and the downshift switch 12D in the first mode during the determination time T1. The controller 16C is configured to start to count a time TC from a timing at which the controller 16C does not receive the communication signal. The controller 16C is configured to compare the time TC with the determination time T1.

Figure 12:
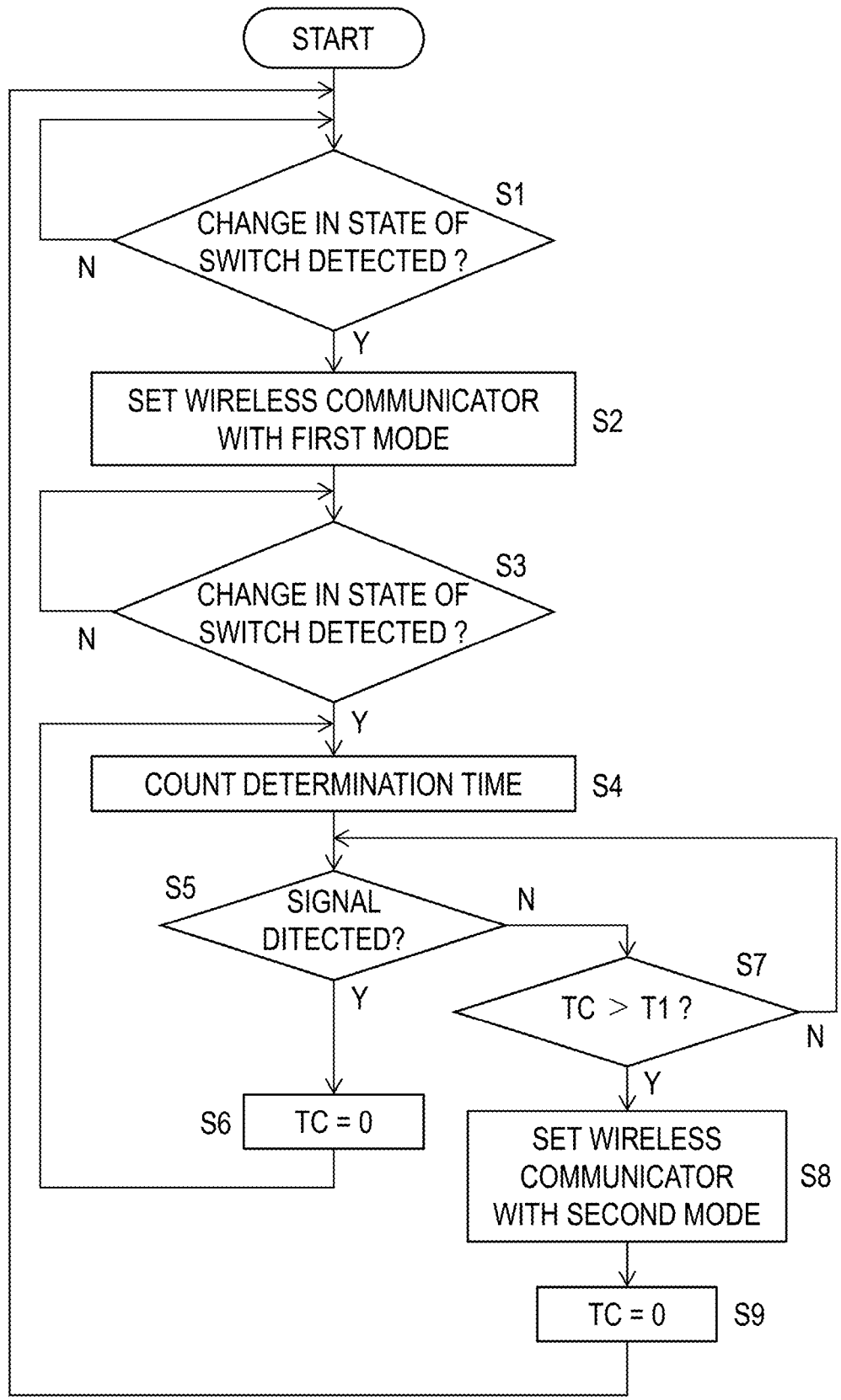
FIG. 12 is a flow chart of the operation of the operating system illustrated in FIG. 2.

As seen in FIG. 12, in the second mode, the controller 16C determines whether the controller 16C detects the change in the state of the switch 18 until the controller 16C detects the change in the state of the switch 18 (step S1). In this embodiment, the controller 16C determines whether the controller 16C detects the activation of the switch 18 (turning on the switch 18). The controller 16C sets the wireless communicator 16W with the first mode if the controller 16C detects the change in the state (e.g., the activation) of the switch 18 (step S2). The controller 16C determines whether the controller 16C detects the change in the state of the switch 18 again after setting the wireless communicator 16W with the first mode until the controller 16C detects the change in the state of the switch 18 (step S3). In this embodiment, the controller 16C determines whether the controller 16C detects the change in the state of the switch 18 again after setting the wireless communicator 16W with the first mode until the controller 16C detects the deactivation of the switch 18 (turning off the switch 18). The controller 16C starts to count the time TC from a timing at which the controller 16C detects the change in the state (the deactivation) of the switch 18 (step S4).

The controller 16C determines whether the controller 16C detects the communication signal (the signal from any of the switch 18, the upshift switch 12U, and the downshift switch 12D) (step S5). The controller 16C resets the time TC if the controller 16C detects the communication signal (steps S5 and S6). The controller 16C starts to count the time TC again after resetting the time TC (step S4). The controller 16C determines whether the time TC is longer than the determination time T1 if the controller 16C does not detect any communication signal (steps S5 and S7). The controller 16C keeps detecting the communication signal until the time TC exceeds the determination time T1 (steps S5 and S7). The controller 16C sets the wireless communicator 16W with the second mode if the time TC exceeds the determination time T1 (steps S7 and S8). The controller 16C resets the time TC after setting the wireless communicator 16W with the second mode (step S9). Thus, the process returns to the step S1.

Figure 13:
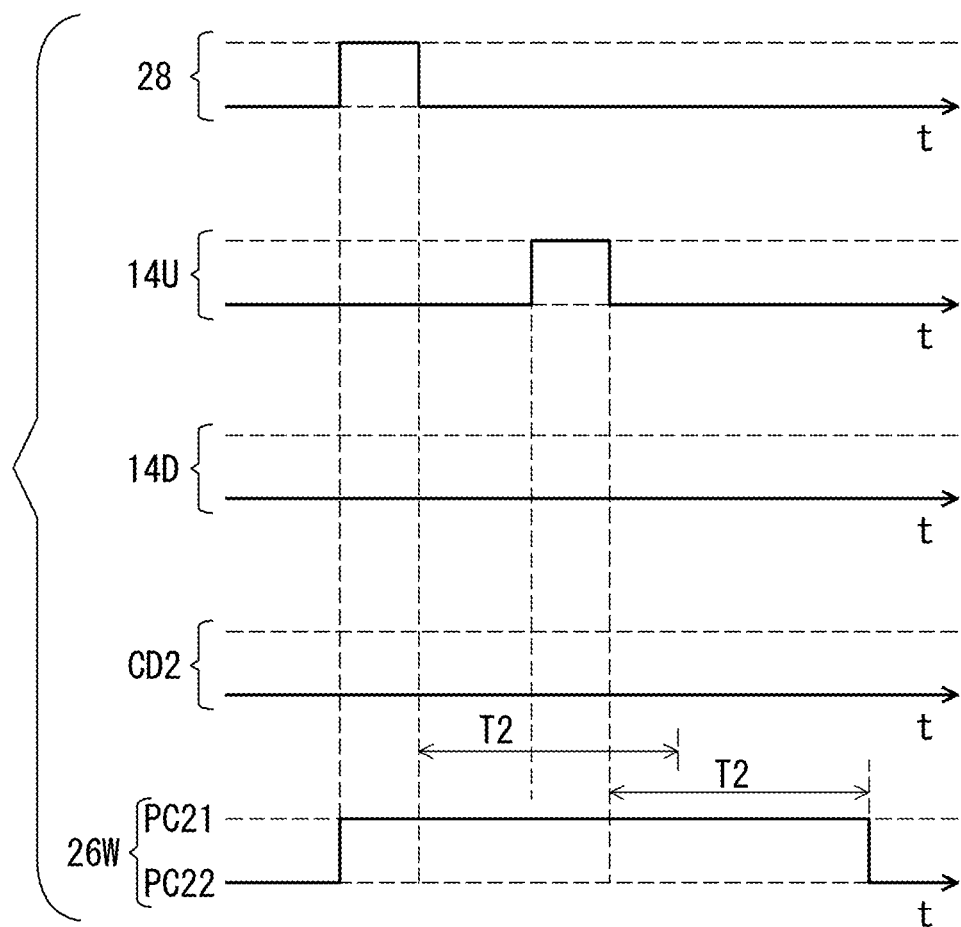
FIG. 13 is a timing chart of an operation of the operating system illustrated in FIG. 2.

As seen in FIG. 13, the wireless communicator 26W has a first mode in which the wireless communicator 26W operates under a first power consumption PC21 and a second mode in which the wireless communicator 26W operates under a second power consumption PC22 which is lower than the first power consumption PC21. The second power consumption PC22 is higher than zero. The second mode can also be referred to as a sleep mode. The controller 26C is configured to detect a change in the state of the at least one switch 28. The controller 26C is configured to detect an activation of the at least one switch 28 in response to the change in the state of the at least one switch 28. The controller 26C is configured to set the wireless communicator 26W with the first mode if the controller 26C detects the change in the state of the at least one switch 28 as the wireless communicator 26W is in the second mode. The controller 26C is configured to set the wireless communicator 26W with the first mode if the controller 26C detects the activation of the at least one switch 28.

In this embodiment, the controller 26C is configured to detect a change in the state of the switch 28. The controller 26C is configured to detect an activation of the switch 28 in response to the change in the state of the switch 28. The controller 26C is configured to set the wireless communicator 26W with the first mode if the controller 26C detects the change in the state of the switch 28 as the wireless communicator 26W is in the second mode. The controller 26C is configured to set the wireless communicator 26W with the first mode if the controller 26C detects the activation of the switch 28.

The controller 26C is configured to set the wireless communicator 26W with the second mode if the wireless communicator 26W does not receive a communication signal in the first mode. In this embodiment, the controller 26C is configured to set the wireless communicator 26W with the second mode if the wireless communicator 26W does not receive the communication signal in the first mode during a determination time T2. The communication signal includes a signal transmitted from the switch 28, the upshift switch 14U, and/or the downshift switch 14D. Thus, the controller 26C is configured to set the wireless communicator 26W with the second mode if the wireless communicator 26W does not receive the signal from both the upshift switch 14U and the downshift switch 14D in the first mode during the determination time T2.

A flow chart of the operation of the wireless communication device 26 is substantially the same as that of the wireless communication device 16 illustrated in FIG. 12. Thus, the flow chart of the operation of the wireless communication device 16 can be utilized as the flow chart of the operation of the wireless communication device 26.

Figure 14:
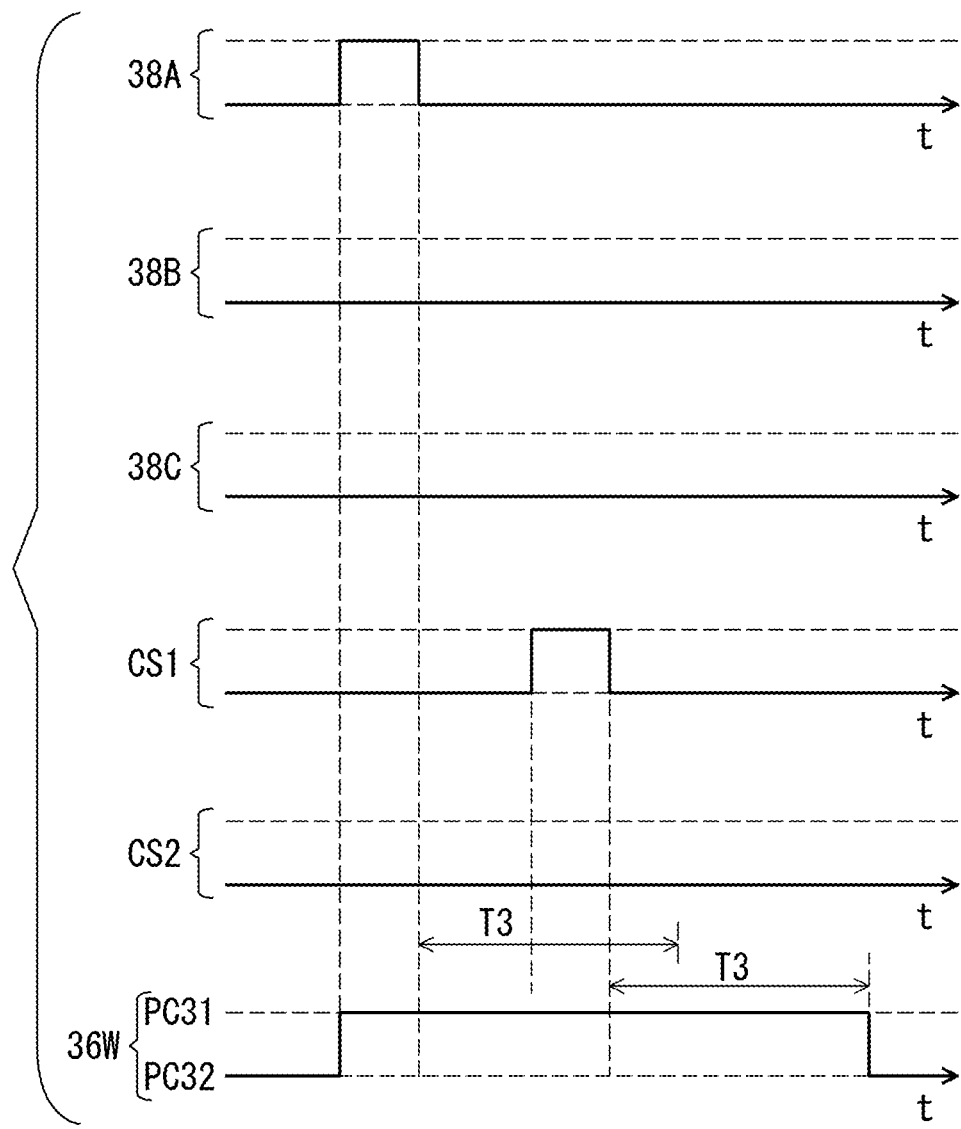
FIG. 14 is a timing chart of an operation of the operating system illustrated in FIG. 2.
Figure 15:
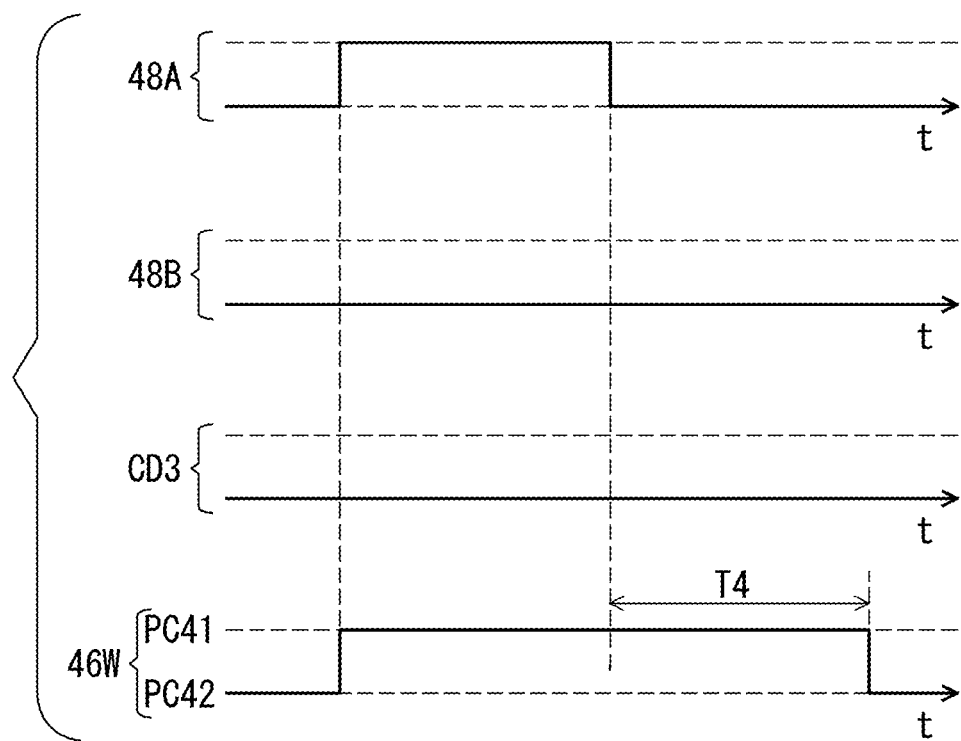
FIG. 15 is a timing chart of an operation of the operating system illustrated in FIG. 2.

As seen in FIG. 14, the wireless communicator 36W has a first mode in which the wireless communicator 36W operates under a first power consumption PC31 and a second mode in which the wireless communicator 36W operates under a second power consumption PC32 which is lower than the first power consumption PC31. The second power consumption PC32 is higher than zero. The second mode can also be referred to as a sleep mode. The controller 36C is configured to detect a change in the state of the at least one switch 38. The controller 36C is configured to detect an activation of the at least one switch 38 in response to the change in the state of the at least one switch 38. The controller 36C is configured to set the wireless communicator 36W with the first mode if the controller 36C detects the change in the state of the at least one switch 38 as the wireless communicator 36W is in the second mode. The controller 36C is configured to set the wireless communicator 36W with the first mode if the controller 36C detects the activation of the at least one switch 38.

In this embodiment, the controller 36C is configured to detect a change in the state of the switch 38A. The controller 36C is configured to detect an activation of the switch 38A in response to the change in the state of the switch 38A. The controller 36C is configured to set the wireless communicator 36W with the first mode if the controller 36C detects the change in the state of the switch 38A as the wireless communicator 36W is in the second mode. The controller 36C is configured to set the wireless communicator 36W with the first mode if the controller 36C detects the activation of the switch 38A.

The controller 36C is configured to detect a change in the state of the switch 38B. The controller 36C is configured to detect an activation of the switch 38B in response to the change in the state of the switch 38B. The controller 36C is configured to set the wireless communicator 36W with the first mode if the controller 36C detects the change in the state of the switch 38B as the wireless communicator 36W is in the second mode. The controller 36C is configured to set the wireless communicator 36W with the first mode if the controller 36C detects the activation of the switch 38B.

The controller 36C is configured to detect a change in the state of the switch 38C. The controller 36C is configured to detect an activation of the switch 38C in response to the change in the state of the switch 38C. The controller 36C is configured to set the wireless communicator 36W with the first mode if the controller 36C detects the change in the state of the switch 38C as the wireless communicator 36W is in the second mode. The controller 36C is configured to set the wireless communicator 36W with the first mode if the controller 36C detects the activation of the switch 38C.

The controller 36C is configured to set the wireless communicator 36W with the second mode if the wireless communicator 36W does not receive a communication signal in the first mode. In this embodiment, the controller 36C is configured to set the wireless communicator 36W with the second mode if the wireless communicator 36W does not receive the communication signal in the first mode during a determination time T3. The communication signal includes a signal transmitted from the switch 38A, the switch 38B, the switch 38C, the operating device 12, the operating device 14, the shift changing device SD1, and/or the shift changing device SD2. Thus, the controller 36C is configured to set the wireless communicator 36W with the second mode if the wireless communicator 36W does not receive the signal from the switch 38A, the switch 38B, the switch 38C, the operating device 12, the operating device 14, the shift changing device SD1, and the shift changing device SD2 in the first mode during the determination time T3.

A flow chart of the operation of the wireless communication device 36 is substantially the same as that of the wireless communication device 16 illustrated in FIG. 12. Thus, the flow chart of the operation of the wireless communication device 16 can be utilized as the flow chart of the operation of the wireless communication device 36.

As seen in FIG. 14, the wireless communicator 46W has a first mode in which the wireless communicator 46W operates under a first power consumption PC41 and a second mode in which the wireless communicator 46W operates under a second power consumption PC42 which is lower than the first power consumption PC41. The second power consumption PC42 is higher than zero. The second mode can also be referred to as a sleep mode. The controller 46C is configured to detect a change in the state of the at least one switch 48. The controller 46C is configured to detect an activation of the at least one switch 48 in response to the change in the state of the at least one switch 48. The controller 46C is configured to set the wireless communicator 46W with the first mode if the controller 46C detects the change in the state of the at least one switch 48 as the wireless communicator 46W is in the second mode. The controller 46C is configured to set the wireless communicator 46W with the first mode if the controller 46C detects the activation of the at least one switch 48.

In this embodiment, the controller 46C is configured to detect a change in the state of the switch 48A. The controller 46C is configured to detect an activation of the switch 48A in response to the change in the state of the switch 48A. The controller 46C is configured to set the wireless communicator 46W with the first mode if the controller 46C detects the change in the state of the switch 48A as the wireless communicator 46W is in the second mode. The controller 46C is configured to set the wireless communicator 46W with the first mode if the controller 46C detects the activation of the switch 48A.

The controller 46C is configured to detect a change in the state of the switch 48B. The controller 46C is configured to detect an activation of the switch 48B in response to the change in the state of the switch 48B. The controller 46C is configured to set the wireless communicator 46W with the first mode if the controller 46C detects the change in the state of the switch 48B as the wireless communicator 46W is in the second mode. The controller 46C is configured to set the wireless communicator 46W with the first mode if the controller 46C detects the activation of the switch 48B.

The controller 46C is configured to set the wireless communicator 46W with the second mode if the wireless communicator 46W does not receive a communication signal in the first mode. In this embodiment, the controller 46C is configured to set the wireless communicator 46W with the second mode if the wireless communicator 46W does not receive the communication signal in the first mode during a determination time T4. The communication signal includes a signal transmitted from the switch 48A, the switch 48B, and the notification device 2. Thus, the controller 46C is configured to set the wireless communicator 46W with the second mode if the wireless communicator 46W does not receive the signal from the switch 48A, the switch 48B, and the notification device 2 in the first mode during the determination time T4.

A flow chart of the operation of the wireless communication device 46 is substantially the same as that of the wireless communication device 16 illustrated in FIG. 12. Thus, the flow chart of the operation of the wireless communication device 16 can be utilized as the flow chart of the operation of the wireless communication device 46.

Second Embodiment

An operating system 210 in accordance with a second embodiment will be described below referring to FIG. 16. The operating system 210 has the same structure and/or configuration as those of the operating system 10 except for the master unit 32 and the power supply 34. Thus, elements having substantially the same function as those in the first embodiment will be numbered the same here and will not be described and/or illustrated again in detail here for the sake of brevity.

Figure 16:
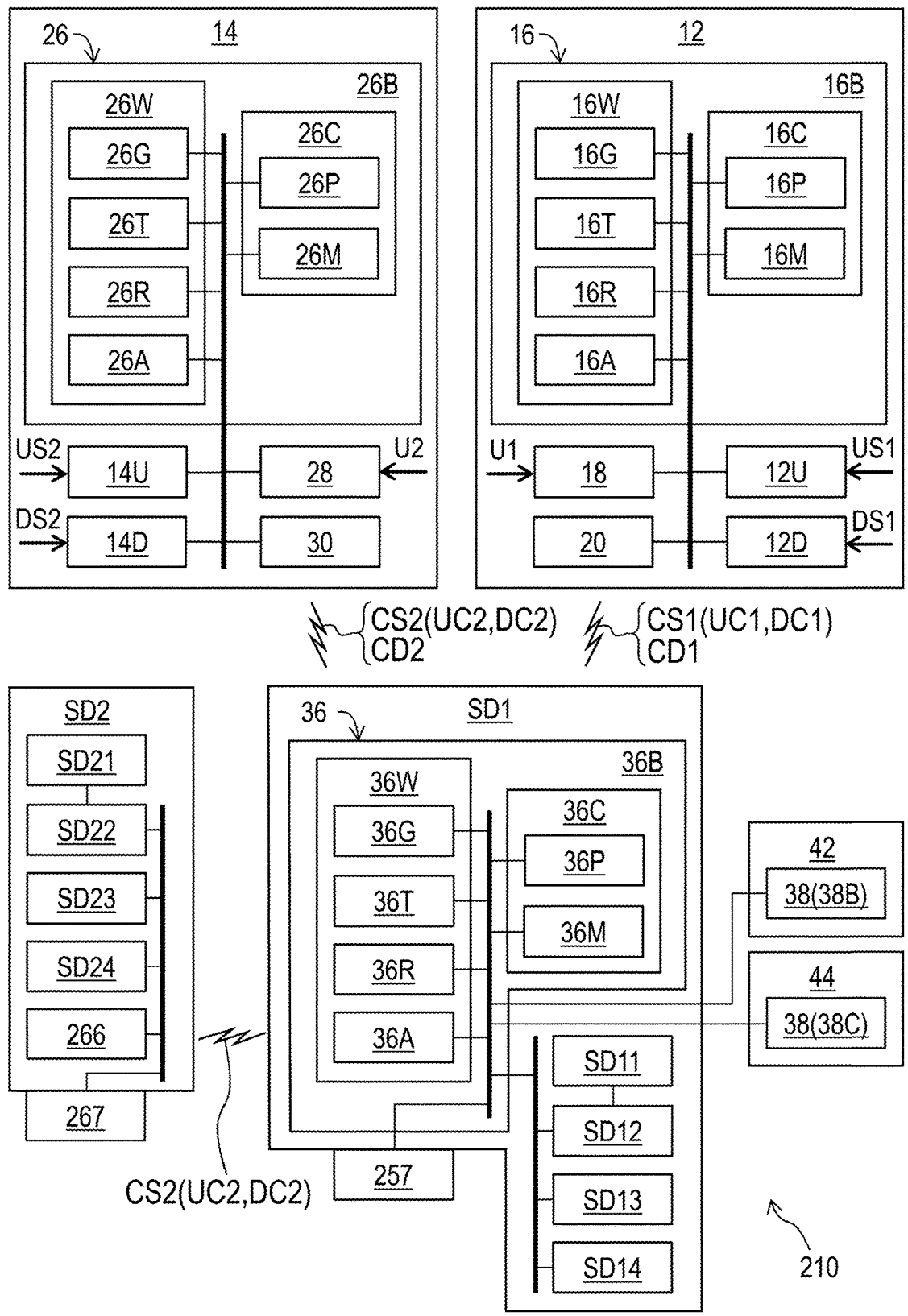
FIG. 16 is a schematic block diagram of an operating system in accordance with a second embodiment.

As seen in FIG. 16, the operating system 210 for the human-powered vehicle VH comprises a wireless communication device 36 and the at least one switch 38. The wireless communication device 36 for the human-powered vehicle VH comprises the wireless communicator 36W and the controller 36C. In this embodiment, the wireless communication device 36 is provided in the shift changing device SD1. The master unit 32 and the power supply 34 are omitted from the operating system 210. The operating system 210 comprises a power supply 257. The power supply 257 is attached to the shift changing device SD1 to supply electricity to the shift changing device SD1. The switch 38A is omitted from the brake caliper 40.

The operating system 210 further comprises a wireless communication device 266 and a power supply 267. The wireless communication device 266 is provided in the shift changing device SD2. The power supply 267 is attached to the shift changing device SD1 to supply electricity to the shift changing device SD2. The wireless communication device 266 has substantially the same structure as that of the wireless communication device 36. If the wireless communication device 36 receives the shift control signal CS2 from the wireless communicator 26W of the operating device 14, the wireless communication device 36 is configured to wirelessly send the shift control signal CS2 to the wireless communication device 266.

Third Embodiment

An operating system 310 in accordance with a third embodiment will be described below referring to FIGS. 17 to 19. The operating system 310 has the same structure and/or configuration as those of the operating system 10 except for the operating devices 12 and 14. Thus, elements having substantially the same function as those in the above embodiments will be numbered the same here and will not be described and/or illustrated again in detail here for the sake of brevity.

Figure 17:
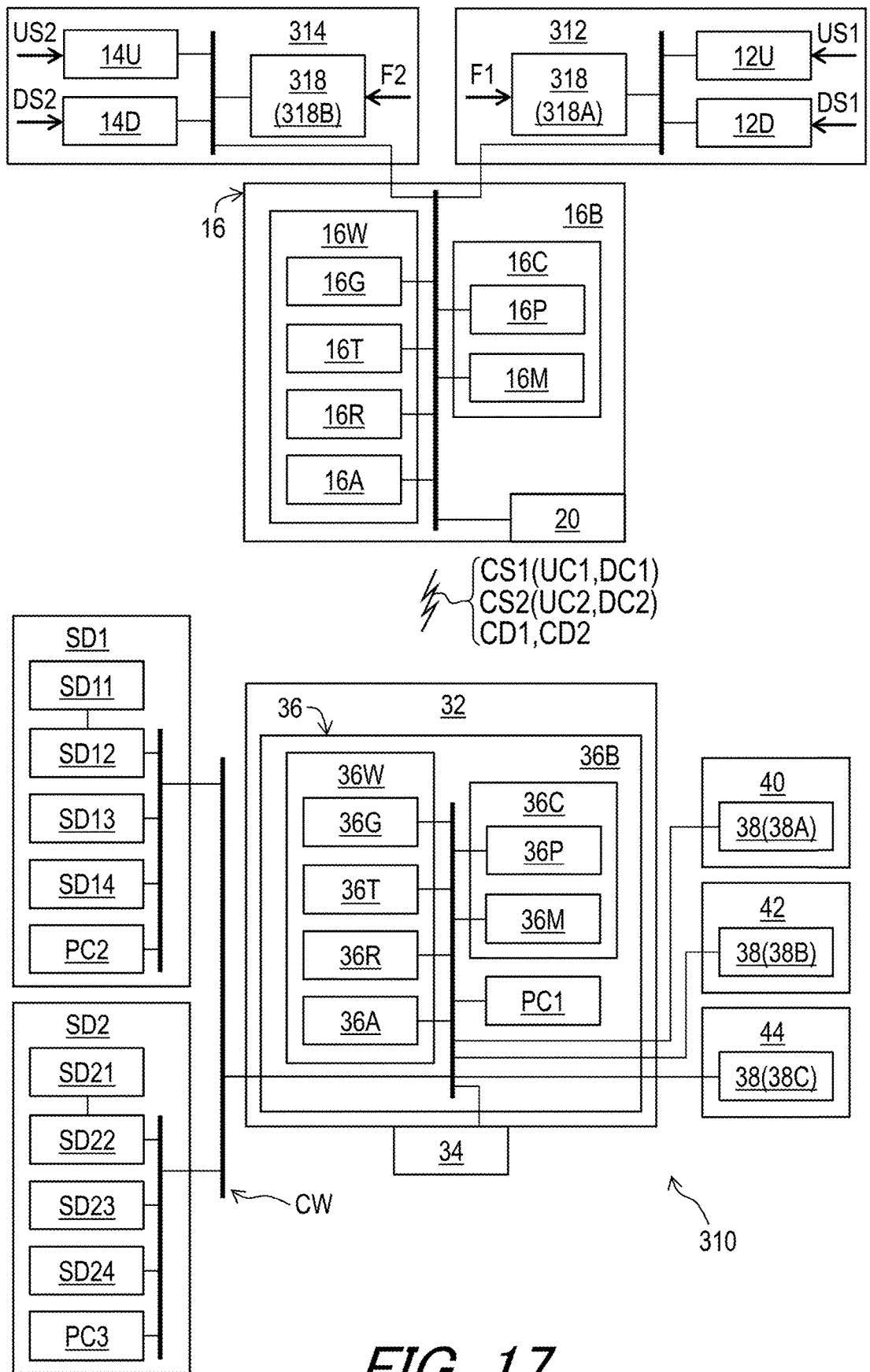
FIG. 17 is a schematic block diagram of an operating system in accordance with a third embodiment.

As seen in FIG. 17, the operating system 310 for the human-powered vehicle VH comprises the wireless communication device 16 and at least one switch 318 attached to a separate component which is provided separately from the wireless communication device 16. The operating system 310 further comprises an operating device 312 provided as the separate component. The operating system 310 further comprises an operating device 314 provided as the separate component. The at least one switch 318 is attached to the operating device 312 to change the state of the at least one switch 318 in response to an operating force F1 output from the operating device 312. The at least one switch 318 is attached to the operating device 314 to change the state of the at least one switch 318 in response to an operating force F2 output from the operating device 314.

In this embodiment, the at least one switch 318 includes switches 318A and 318B. The switch 318A is attached to the operating device 312 to change the state of the switch 318A in response to the operating force F1 output from the operating device 312. The switch 318B is attached to the operating device 314 to change the state of the switch 318B in response to the operating force F1 output from the operating device 314.

Figure 18:
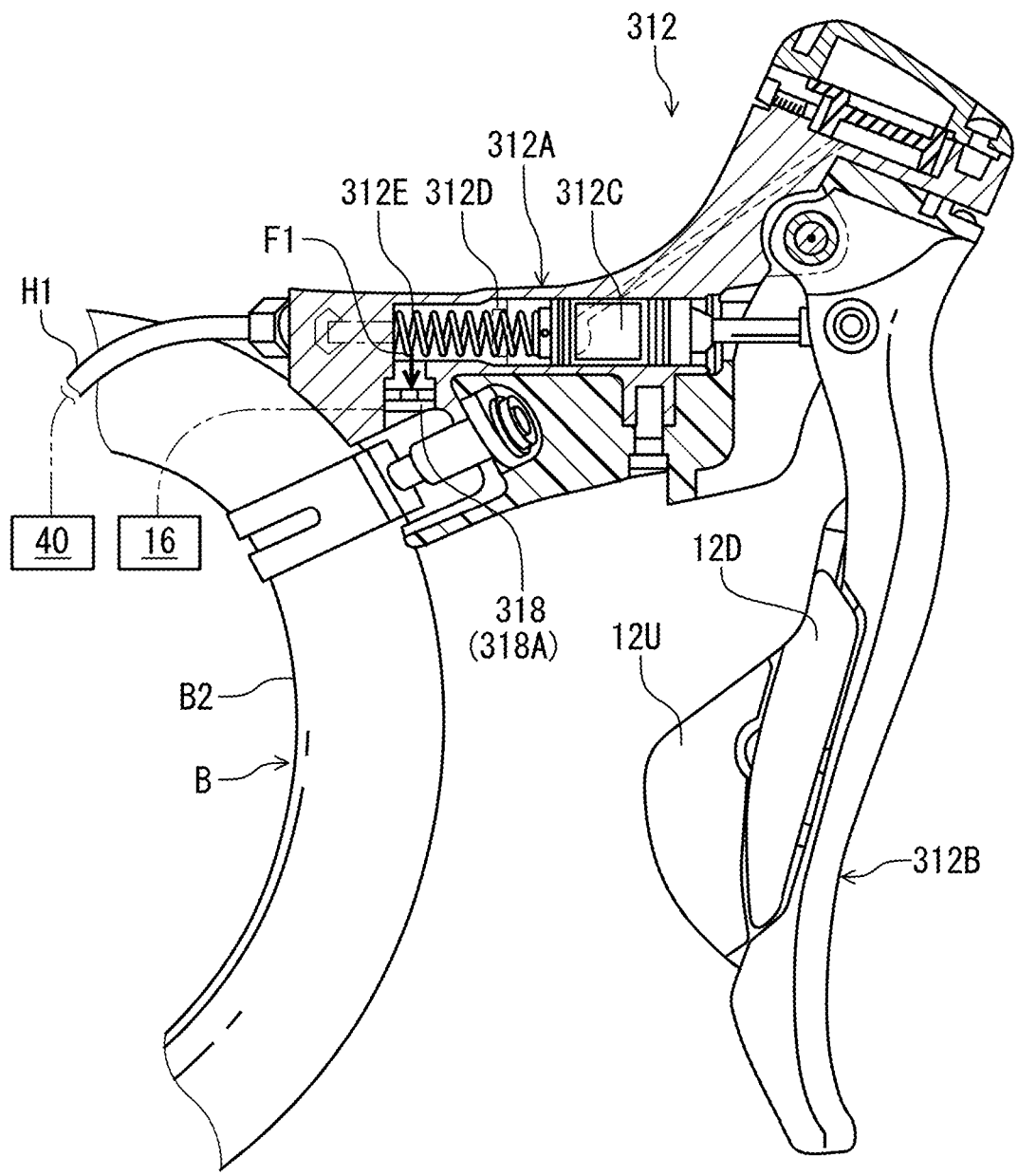
FIG. 18 is a cross-sectional view of an operating device of the operating system in accordance with the third embodiment.

As seen in FIG. 18, the at least one switch 318 is attached to the operating device 312 to change the state of the at least one switch 318 in response to a hydraulic pressure generated by the operating device 312 as the operating force F1. In this embodiment, the switch 318A is attached to the operating device 312 to change the state of the switch 318A in response to a hydraulic pressure generated by the operating device 312 as the operating force F1.

The operating device 312 includes a bracket 312A, a lever 312B, a master piston 312C, and a master chamber 312D. The bracket 312A includes a master cylinder bore 312E. The lever 312B is pivotally coupled to the bracket 312A. The master piston 312C is movably provided in the master cylinder bore 312E and is coupled to the lever 312B. The master piston 312C and the master cylinder bore 312E define the master chamber 312D. The master chamber 312D is in fluid communication with the brake caliper 40 with the hydraulic hose H1. The operating device 312 is configured to generate the hydraulic pressure in the master chamber 312D in response to a pivotal movement of the lever 312B relative to the bracket 312A.

The operating device 312 includes a switch piston 312F. The bracket 312A includes an additional bore 312G. The switch piston 312F is movably provided in the additional bore 312G to press the switch 318A. The operating force F1 generated by the hydraulic pressure moves the switch piston 312F toward the switch 318A, activating the switch 318A.

Figure 19:
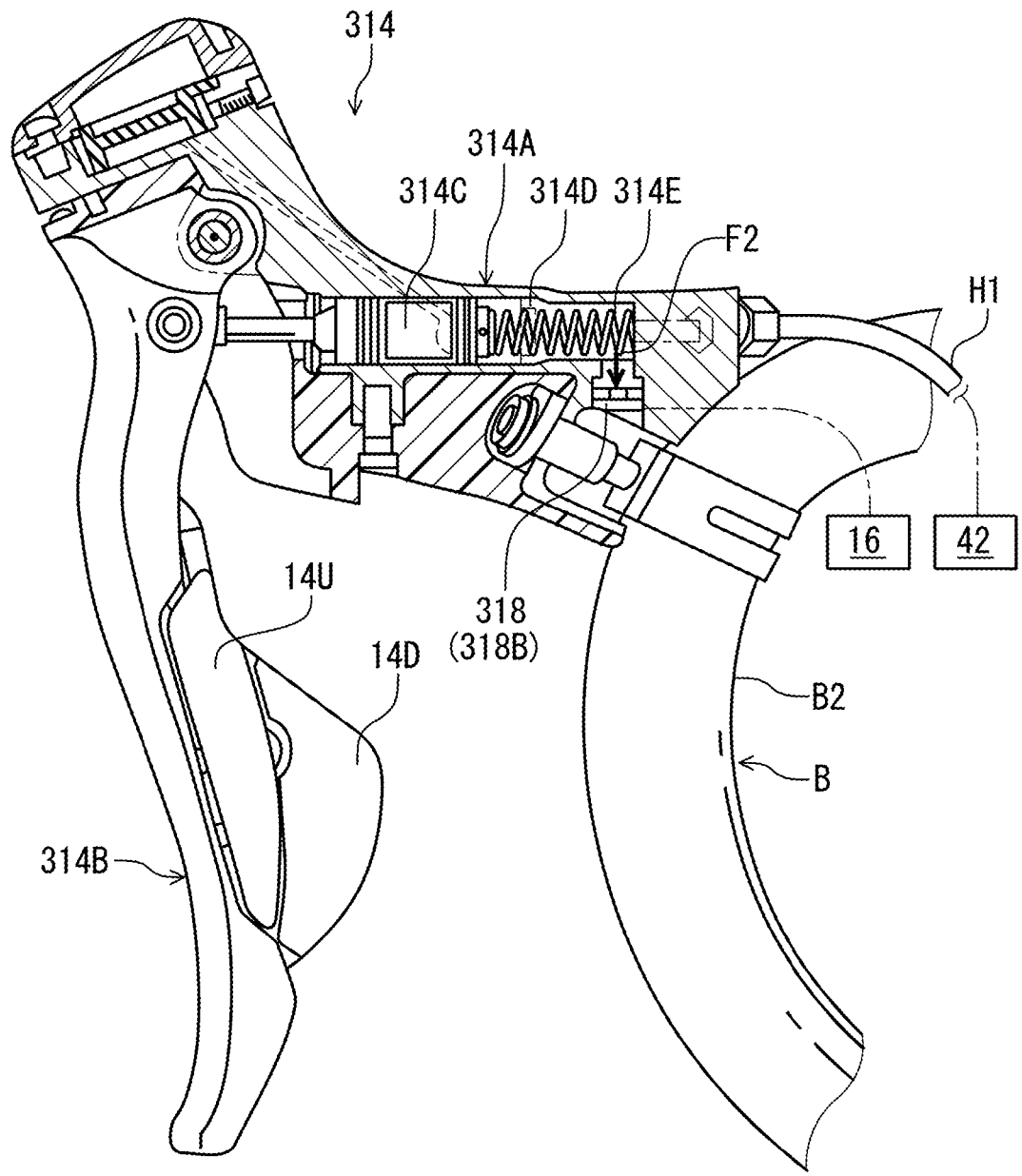
FIG. 19 is a cross-sectional view of an operating device of the operating system in accordance with the third embodiment.

As seen in FIG. 19, the at least one switch 318 is attached to the operating device 314 to change the state of the at least one switch 318 in response to a hydraulic pressure generated by the operating device 314 as the operating force F2. In this embodiment, the switch 318B is attached to the operating device 314 to change the state of the switch 318B in response to a hydraulic pressure generated by the operating device 314 as the operating force F2.

The operating device 314 includes a bracket 314A, a lever 314B, a master piston 314C, and a master chamber 314D. The bracket 314A includes a master cylinder bore 314E. The lever 314B is pivotally coupled to the bracket 314A. The master piston 314C is movably provided in the master cylinder bore 314E and is coupled to the lever 314B. The master piston 314C and the master cylinder bore 314E define the master chamber 314D. The master chamber 314D is in fluid communication with the brake caliper 42 with the hydraulic hose H2. The operating device 314 is configured to generate the hydraulic pressure in the master chamber 314D in response to a pivotal movement of the lever 314B relative to the bracket 314A.

The operating device 314 includes a switch piston 314F. The bracket 314A includes an additional bore 314G. The switch piston 314F is movably provided in the additional bore 314G to press the switch 318B. The operating force F2 generated by the hydraulic pressure moves the switch piston 314F toward the switch 318B, activating the switch 318B.

As seen in FIG. 17, the wireless communication device 16 is configured to wirelessly transmit each of the shift control signal CS1 (e.g., the upshift control signal UC1 and the downshift control signal DC1) and the shift control signal CS2 (e.g., the upshift control signal UC2 and the downshift control signal DC2) to the wireless communication device 36 provided in the master unit 32.

Modification

In the above embodiments, examples of the separate component include the brake caliper, the seatpost, the pedal, and the operating device. However, examples of the separate component can include other components such as a hydraulic hose, a mechanical cable, an electric cable, and a bicycle stand.

In the above embodiments, the switch 48 is mounted to the pedal 50 which does not include a binding structure. However, the switch 48 can be mounted to a pedal including a binding structure.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Obviously, numerous modifications and variations of the present invention are possible in light of the above teachings. It is therefore to be understood that within the scope of the appended claims, the invention may be practiced otherwise than as specifically described herein.

What is claimed is:

1. A wireless communication device for a human-powered vehicle, comprising:
    a wireless communicator configured to wirelessly communicate with an additional wireless communicator, the wireless communicator having
        a first mode in which the wireless communicator operates under a first power consumption, and
        a second mode in which the wireless communicator operates under a second power consumption which is lower than the first power consumption; and
    a controller configured to detect a change in a state of at least one switch, the controller being configured to set the wireless communicator with the first mode if the controller detects the change in the state of the at least one switch as the wireless communicator is in the second mode, wherein
    the at least one switch has an activation state and a deactivation state,
    the at least one switch is a normally-open switch,
    the controller is configured to set the wireless communicator with the first mode if the controller detects the activation state of the at least one switch in response to the change in the state of the at least one switch as the wireless communicator is in the second mode,
    the controller is configured to set the wireless communicator with the second mode if the wireless communicator does not receive a communication signal in the first mode during a determination time,
    the communication signal is a signal from the at least one switch, and
    the determination time begins when the controller detects the deactivation state of the at least one switch when the at least one switch is turned off.

2. The wireless communication device according to claim 1, wherein
    the wireless communicator is configured to wirelessly receive a shift control signal to change a shift position of a shift changing device from the additional wireless communicator of an operating device.

3. The wireless communication device according to claim 1, further comprising
    the at least one switch configured to change the state of the at least one switch in response to a user input.

4. An operating system for a human-powered vehicle, comprising:
    the wireless communication device according to claim 1; and
    the at least one switch attached to a separate component which is provided separately from the wireless communication device.

5. The operating system according to claim 4, further comprising
    a brake caliper provided as the separate component, wherein
    the at least one switch is attached to the brake caliper to change the state of the at least one switch in response to an operating force applied to the brake caliper.

6. The operating system according to claim 5, wherein
    the at least one switch is attached to the brake caliper to change the state of the at least one switch in response to a hydraulic pressure applied to the brake caliper as the operating force.

7. The operating system according to claim 4, further comprising
    a seatpost provided as the separate component, wherein
    the at least one switch is attached to the seatpost to change the state of the at least one switch in response to a user's weight applied to the seatpost.

8. The operating system according to claim 4, further comprising
    an operating device provided as the separate component, wherein
    the at least one switch is attached to the operating device to change the state of the at least one switch in response to an operating force output from the operating device.

9. The operating system according to claim 8, wherein
    the at least one switch is attached to the operating device to change the state of the at least one switch in response to a hydraulic pressure generated by the operating device as the operating force.

10. The operating system according to claim 4, further comprising
    a pedal provided as the separate component, wherein
    the at least one switch is attached to the pedal to change the state of the at least one switch in response to a weight of a user's foot applied to the pedal.

11. The operating system according to claim 10, further comprising
    a pedaling force sensor configured to sense a pedaling force applied to a crank to which the pedal is attached, the pedaling force sensor being configured to generate an output signal indicating the pedaling force.

12. The operating system according to claim 11, wherein
    the wireless communicator is configured to wirelessly transmit the output signal to the additional wireless communicator of a notification device.

13. The wireless communication device according to claim 1, wherein
    the wireless communicator includes a signal transmitting circuit and a signal receiving circuit.

14. The wireless communication device according to claim 13, wherein
    the wireless communicator further includes a signal generating circuit and an antenna.

15. The wireless communication device according to claim 13, wherein
    the controller includes a processor and a memory.

16. The wireless communication device according to claim 1, further comprising
    a circuit board, wherein the wireless communicator and the controller are separately provided on the circuit board.

17. The wireless communication device according to claim 1, wherein
the controller is configured to detect an activation of the at least one switch in response to the change in the state of the at least one switch, and
the controller is configured to set the wireless communicator with the first mode if the controller detects the activation of the at least one switch.

18. The wireless communication device according to claim 1, wherein
the second power consumption is higher than zero.

19. An operating system for a human-powered vehicle, comprising:
a wireless communication device including;
a wireless communicator configured to wirelessly communicate with an additional wireless communicator, the wireless communicator having
a first mode in which the wireless communicator operates under a first power consumption, and
a second mode in which the wireless communicator operates under a second power consumption which is lower than the first power consumption; and
a controller configured to detect a change in a state of at least one switch, the controller being configured to set the wireless communicator with the first mode if the controller detects the change in the state of the at least one switch as the wireless communicator is in the second mode,
the controller being different from the wireless communicator,
the wireless communicator being configured to wirelessly receive a shift control signal to change a shift position of a shift changing device from the additional wireless communicator of an operating device,
the at least one switch attached to a brake caliper which is provided separately from the wireless communication device and the operating device,
the at least one switch including a switch circuit disposed within a caliper body of the brake caliper, and
the switch circuit is disposed within a bore extending through an outer wall of the caliper body of the brake caliper.

20. The operating system according to claim 19, wherein
the bore extending from an outermost surface of the caliper body to an interior of the caliper body.

21. An operating system for a human-powered vehicle, comprising:
a wireless communication device including;
a wireless communicator configured to wirelessly communicate with an additional wireless communicator, the wireless communicator having
a first mode in which the wireless communicator operates under a first power consumption, and
a second mode in which the wireless communicator operates under a second power consumption which is lower than the first power consumption; and
a controller configured to detect a change in a state of at least one switch including a switch circuit, the controller being configured to set the wireless communicator with the first mode if the controller detects the change in the state of the at least one switch as the wireless communicator is in the second mode,
the controller being different from the wireless communicator,
the wireless communicator being configured to wirelessly receive a shift control signal to change a shift position of a shift changing device from the additional wireless communicator of an operating device,
the at least one switch including the switch circuit is attached to one of a seatpost and a pedal, which is provided separately from the wireless communication device and the operating device,
the wireless communicator being electrically connected to the shift changing device with an electrical communication wiring, and
the wireless communicator being attached to a vehicle body of the human-powered vehicle at a location separate from the shift changing device, the location that the wireless communicator is attached to the vehicle body being closer to at least a portion of the shift changing device than the wireless communicator is to the additional wireless communicator.

* * * * *